United States Patent
Oshima et al.

(10) Patent No.: US 7,592,402 B2
(45) Date of Patent: *Sep. 22, 2009

(54) PROCESS FOR PRODUCING MODIFIED PARTICLE; CARRIER; CATALYST COMPONENT FOR ADDITION POLYMERIZATION; PROCESS FOR PRODUCING CATALYST FOR ADDITION POLYMERIZATION; AND PROCESS FOR PRODUCING ADDITION POLYMER

(75) Inventors: Hideki Oshima, Ichihara (JP); Makoto Satoh, Ichihara (JP)

(73) Assignee: Sumitomo Chemical Company, Limited, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 11/044,183

(22) Filed: Jan. 28, 2005

(65) Prior Publication Data
US 2005/0245701 A1 Nov. 3, 2005

(30) Foreign Application Priority Data

Apr. 30, 2004 (JP) ............... 2004-135502
Apr. 30, 2004 (JP) ............... 2004-135503

(51) Int. Cl.
*C08F 4/58* (2006.01)
*C08F 4/52* (2006.01)

(52) U.S. Cl. ............... 526/128; 526/160; 526/170; 526/135; 526/941; 526/943; 502/118; 502/103

(58) Field of Classification Search ............... 502/123, 502/124, 125, 128, 129, 279, 278, 300, 118, 502/113, 232, 208, 216; 526/118, 116, 117, 526/114, 115, 141, 142, 143, 160, 129, 128, 526/130, 153, 154, 158, 170; 523/134
See application file for complete search history.

(56) References Cited

U.S. PATENT DOCUMENTS

| | | | |
|---|---|---|---|
| 4,276,399 A | 6/1981 | Rekers et al. | |
| 4,542,199 A | 9/1985 | Kaminsky et al. | |
| 4,990,640 A | 2/1991 | Tsutsui et al. | |
| 6,333,388 B1 | 12/2001 | Kumamoto et al. | |
| 6,586,356 B2 * | 7/2003 | Takaoki et al. ............... | 502/155 |
| 6,870,015 B2 * | 3/2005 | Oshima et al. ............... | 526/114 |
| 7,008,897 B2 * | 3/2006 | Takaoki ....................... | 502/103 |
| 7,115,539 B2 * | 10/2006 | Takaoki et al. ............... | 502/158 |
| 2002/0143124 A1 * | 10/2002 | Ogane ......................... | 526/160 |
| 2004/0097364 A1 * | 5/2004 | Gao et al. .................... | 502/113 |
| 2004/0209762 A1 * | 10/2004 | Takaoki et al. ............... | 502/102 |

FOREIGN PATENT DOCUMENTS

| | | |
|---|---|---|
| EP | 0 277 004 A1 | 8/1988 |
| EP | 0 571 987 A2 | 12/1993 |
| JP | 10-17617 | 1/1998 |
| JP | 11-12319 | 1/1999 |
| JP | 11-343306 | 12/1999 |
| JP | 3196419 | 6/2001 |
| JP | 3264338 | 12/2001 |

* cited by examiner

*Primary Examiner*—David W
*Assistant Examiner*—Rip A. Lee
(74) *Attorney, Agent, or Firm*—Foley & Lardner LLP

(57) ABSTRACT

A process for producing a modified particle, which comprises the step of contacting a compound (a) defined by the formula, $M^1L^1_3$, a compound (b) defined by the formula, $R^1_{t-1}TH$, a compound (c) or (e) defined by the formula, $R^2_{m-u}M^2(OH)_u$ or $R^2_{4-n}J(OH)_n$, respectively, and a particle (d) with one another; a carrier comprising a modified particle produced by said process; a catalyst component (A) comprising a modified particle produced by said process; a process for producing a catalyst for addition polymerization, which comprises the step of contacting said catalyst component (A), a transition metal compound (B) and an optional organoaluminum compound (C) with one another; and a process for producing an addition polymer, which comprises the step of addition polymerizing an addition-polymerizable monomer in the presence of a catalyst for addition polymerization produced by said process.

9 Claims, No Drawings

PROCESS FOR PRODUCING MODIFIED PARTICLE; CARRIER; CATALYST COMPONENT FOR ADDITION POLYMERIZATION; PROCESS FOR PRODUCING CATALYST FOR ADDITION POLYMERIZATION; AND PROCESS FOR PRODUCING ADDITION POLYMER

FIELD OF THE INVENTION

The present invention relates to a process for producing a modified particle; a carrier; a catalyst component for addition polymerization; a process for producing a catalyst for addition polymerization; and a process for producing an addition polymer.

BACKGROUND OF THE INVENTION

There are known the following so-called single-site catalysts, which polymerize an addition-polymerizable monomer such as an olefin to produce an addition polymer:

(1) a catalyst obtained by combining bis(cyclopentadienyl)zirconium dichloride with methylaluminoxane, and a catalyst obtained by combining said transition metal compound with a specific boron compound (JP 58-19309A, corresponding to U.S. Pat. No. 4,542,199);

(2) a catalyst obtained by combining bis(cyclopentadienyl) zirconium dimethyl with tri(n-butyl)ammonium tetraxis (pentafluorophenyl)borate (JP 1-502036W, corresponding to EP 277004A);

(3) a catalyst, which slightly lowers homogeneity of an addition polymer obtained (JP 5-320248A, corresponding to EP 571987A; JP 10-17617A; JP 11-12319A; and JP 11-343306A), wherein the term "homogeneity" means uniformity of polymerization of a comonomer in case that said addition polymer is a copolymer; and (4) a catalyst obtained by using a specific particle as one of catalyst components (JP 61-296008A corresponding to U.S. Pat. Nos. 4,808,561, 4,897,455 and 5,191,052; and JP 9-249707A corresponding to U.S. Pat. Nos. 6,100,213 and 6,333,388).

SUMMARY OF THE INVENTION

However, each of the above-mentioned catalysts has a problem in that an addition polymer produced with a large amount of hydrogen as a molecular weight regulator has a small molecular weight.

In view of said problem, an object of the present invention is to provide (1) a process for producing an addition polymer, which has a large molecular weight even if produced with a large amount of hydrogen as a molecular weight regulator, (2) a process for producing a single-site catalyst used for said process for producing an addition polymer; (3) a catalyst component used for said process for producing a catalyst, and (4) a process for producing a modified particle suitable for said catalyst component.

The present invention is a process for producing a modified particle, which comprises the step of contacting a compound (a) represented by the following formula [1], a compound (b) represented by the following formula [2], a compound (c) represented by the following formula [3], and a particle (d) with one another:

  [1]

  [2]

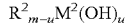  [3]

wherein $M^1$ is an atom of Group 13 in the periodic table; $L^1$ is a hydrogen atom, a hydrocarbon group or a halogen atom, and three $L^1$s are the same as, or different from one another; T is a non-metal atom of Group 15 or 16 in the periodic table; t is the valence of T; $R^1$ is an electron-withdrawing group or a group containing an electron-withdrawing group, and when plural $R^1$s exist, they are the same as, or different from one another; $M^2$ is a metal atom of Groups 2 to 12 in the periodic table, or a boron atom; m is the valence of $M^2$; u is a number satisfying $2 \leq u \leq m$; and $R^2$ is a hydrocarbon group or a halogenated hydrocarbon group, and when plural $R^2$s exist, they are the same as, or different from one another. This process is hereinafter referred to as "process 1".

Also, the present invention is a process for producing a modified particle, which comprises the step of contacting a compound (a) represented by the above formula [1], a compound (b) represented by the above formula [2], a compound (e) represented by the following formula [4], and a particle (d) with one another:

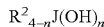  [4]

wherein J is a non-metal atom of Group 14 in the periodic table; n is a number satisfying $2 \leq n \leq 4$; and $R^2$ is a hydrocarbon group or a halogenated hydrocarbon group, and when plural $R^2$s exist, they are the same as, or different from one another. This process is hereinafter referred to as "process 2", and the above-mentioned processes 1 and 2 are collectively referred to as "process of the present invention".

Further, the present invention is a carrier, which comprises a modified particle produced by the above-mentioned process 1 or process 2.

Still further, the present invention is a catalyst component (A) for addition polymerization, which comprises a modified particle produced by the above-mentioned process 1 or process 2.

Also, the present invention is a process for producing a catalyst for addition polymerization, which comprises the step of contacting the above-mentioned catalyst component (A) for addition polymerization, a transition metal compound (B) and an optional organoaluminum compound (C) with one another.

Also, the present invention is a process for producing an addition polymer, which comprises the step of addition polymerizing an addition-polymerizable monomer in the presence of a catalyst for addition polymerization produced by the above-mentioned process.

In the present invention, the above-mentioned catalyst component (A) for addition polymerization, the above-mentioned transition metal compound (B), and the above-mentioned organoaluminum compound (C) are hereinafter referred to as "component (A)", "component (B)" and "component (C)", respectively.

DETAILED DESCRIPTION OF THE INVENTION

Examples of $M^1$ in the above formula [1] are a boron atom, an aluminum atom, a gallium atom, an indium atom and a thallium atom. Among them, preferred is a boron atom or an aluminum atom, and particularly preferred is an aluminum atom.

Examples of the halogen atom of $L^1$ in the above formula [1] are a fluorine atom, a chlorine atom, a bromine atom and an iodine atom.

The hydrocarbon group of $L^1$ in the above formula [1] is preferably an alkyl group, an aryl group or an aralkyl group.

Said alkyl group is preferably an alkyl group having 1 to 20 carbon atoms such as a methyl group, an ethyl group, a n-propyl group, an isopropyl group, a n-butyl group, a sec-butyl group, a tert-butyl group, an isobutyl group, a n-pentyl group, a neopentyl group, a n-hexyl group, a n-heptyl group, a n-octyl group, a n-decyl group, a n-dodecyl group, a n-pentadecyl group and a n-eicosyl group. Among them, more preferred is a methyl group, an ethyl group, an isopropyl group, a tert-butyl group or an isobutyl group.

One or more hydrogen atoms contained in the above-mentioned alkyl groups may be substituted with a halogen atom such as a fluorine atom, a chlorine atom, a bromine atom and an iodine atom. Examples of an alkyl group, whose one or more hydrogen atoms are substituted with a halogen atom, are a fluoromethyl group, a difluoromethyl group, a trifluoromethyl group, a fluoroethyl group, a difluoroethyl group, a trifluoroethyl group, a tetrafluoroethyl group, a pentafluoroethyl group, a perfluoropropyl group, a perfluorobutyl group, a perfluoropentyl group, a perfluorohexyl group, a perfluorooctyl group, a perfluorododecyl group, a perfluoropentadecyl group, a perfluoroeicosyl group, a 1H,1H-perfluoropropyl group, a 1H,1H-perfluorobutyl group, a 1H,1H-perfluoropentyl group, a 1H,1H-perfluorohexyl group, a 1H,1H-perfluorooctyl group, a 1H,1H-perfluorododecyl group, a 1H,1H-perfluoropentadecyl group and a 1H,1H-perfluoroeicosyl group; and alkyl groups obtained by changing "fluoro" contained in the above-mentioned alkyl groups to "chloro", "bromo" or "iodo".

The above-mentioned aryl group is preferably an aryl group having 6 to 20 carbon atoms such as a phenyl group, a 2-tolyl group, a 3-tolyl group, a 4-tolyl group, a 2,3-xylyl group, a 2,4-xylyl group, a 2,5-xylyl group, a 2,6-xylyl group, a 3,4-xylyl group, a 3,5-xylyl group, a 2,3,4-trimethylphenyl group, a 2,3,5-trimethylphenyl group, a 2,3,6-trimethylphenyl group, a 2,4,6-trimethylphenyl group, a 3,4,5-trimethylphenyl group, a 2,3,4,5-tetramethylphenyl group, a 2,3,4,6-tetramethylphenyl group, a 2,3,5,6-tetramethylphenyl group, a pentamethylphenyl group, an ethylphenyl group, a n-propylphenyl group, an isopropylphenyl group, a n-butylphenyl group, a sec-butylphenyl group, a tert-butylphenyl group, an isobutylphenyl group, a n-pentylphenyl group, a neopentylphenyl group, a n-hexylphenyl group, a n-octylphenyl group, a n-decylphenyl group, a n-dodecylphenyl group, a n-tetradecylphenyl group, a naphthyl group and an anthracenyl group. Among them, more preferred is a phenyl group.

One or more hydrogen atoms contained in the above-mentioned aryl groups may be substituted with a halogen atom such as a fluorine atom, a chlorine atom, a bromine atom and an iodine atom; an alkoxy group such as a methoxy group and an ethoxy group; an aryloxy group such as a phenoxy group; or an aralkyloxy group such as a benzyloxy group.

The above-mentioned aralkyl group is preferably an aralkyl group having 7 to 20 carbon atoms such as a benzyl group, a (2-methylphenyl)methyl group, a (3-methylphenyl)methyl group, a (4-methylphenyl)methyl group, a (2,3-dimethylphenyl)methyl group, a (2,4-dimethylphenyl)methyl group, a (2,5-dimethylphenyl)methyl group, a (2,6-dimethylphenyl)methyl group, a (3,4-dimethylphenyl)methyl group, a (3,5-dimethylphenyl)methyl group, a (2,3,4-trimethylphenyl)methyl group, a (2,3,5-trimethylphenyl)methyl group, a (2,3,6-trimethylphenyl)methyl group, a (3,4,5-trimethylphenyl)methyl group, a (2,4,6-trimethylphenyl)methyl group, a (2,3,4,5-tetramethylphenyl)methyl group, a (2,3,4,6-tetramethylphenyl)methyl group, a (2,3,5,6-tetramethylphenyl)methyl group, a (pentamethylphenyl)methyl group, an (ethylphenyl)methyl group, a (n-propylphenyl)methyl group, an (isopropylphenyl)methyl group, a (n-butylphenyl)methyl group, a (sec-butylphenyl)methyl group, a (tert-butylphenyl)methyl group, an (isobutylphenyl)methyl group, a (n-pentylphenyl)methyl group, a (neopentylphenyl)methyl group, a (n-hexylphenyl)methyl group, a (n-octylphenyl)methyl group, a (n-decylphenyl)methyl group, a naphthylmethyl group and an anthracenylmethyl group. Among them, more preferred is a benzyl group.

One or more hydrogen atoms contained in the above-mentioned aralkyl groups may be substituted with a halogen atom such as a fluorine atom, a chlorine atom, a bromine atom and an iodine atom.

$L^1$ in the above formula [1] is preferably a hydrogen atom, an alkyl group, an aryl group or a halogen atom; more preferably a hydrogen atom, an alkyl group or a halogen atom; further preferably an alkyl group; particularly preferably a methyl group, an ethyl group, an isopropyl group or a n-octyl group; and most preferably an ethyl group.

Examples of the non-metal atom of Group 15 of T in the above formula [2] are a nitrogen atom and a phosphorous atom; and examples of the non-metal atom of Group 16 thereof are an oxygen atom and a sulfur atom. Among them, T is preferably a nitrogen atom or an oxygen atom, and particularly preferably an oxygen atom.

In the above formulas [2], when T is a non-metal atom of Group 15, t is 3, and when T is a non-metal atom of Group 16, t is 2.

As an index of an electron-withdrawing property of the electron-withdrawing group of $R^1$ in the above formula [2], there is known a substituent constant, σ, in the Hammet's rule, and a functional group having a positive σ is an example of the electron-withdrawing group.

Examples of the electron-withdrawing group of $R^1$ in the above formula [2] are a fluorine atom, a chlorine atom, a bromine atom, an iodine atom, a cyano group, a nitro group, a carbonyl group, a sulfone group and a phenyl group.

Examples of the electron-withdrawing group-containing group, which means a group containing an electron-withdrawing group, of $R^1$ in the above formula [2] are a halogenated alkyl group, a halogenated aryl group, a (halogenated alkyl)aryl group, a cyanated aryl group, a nitrated aryl group, an ester group (for example, an alkoxycarbonyl group, an aralkyloxycarbonyl group and an aryloxycarbonyl group), an acyl group and a halogenated acyl group.

Examples of said halogenated alkyl group are a fluoromethyl group, a difluoromethyl group, a trifluoromethyl group, a 2,2,2-trifluoroethyl group, a 2,2,3,3,3-pentafluoropropyl group, a 2,2,2-trifluoro-1-trifluoromethylethyl group, a 1,1-bis(trifluoromethyl)-2,2,2-trifluoroethyl group, a 1H,1H-perfluorobutyl group, a 1H,1H-perfluoropentyl group, a 1H,1H-perfluorohexyl group, a 1H,1H-perfluorooctyl group, a 1H,1H-perfluorododecyl group, a 1H,1H-perfluoropentadecyl group and a 1H,1H-perfluoroeicosyl group; and halogenated alkyl groups obtained by changing "fluoro" contained in the above-mentioned halogenated alkyl groups to "chloro", "bromo" or "iodo".

Examples of the above-mentioned halogenated aryl group are a 2-fluorophenyl group, a 3-fluorophenyl group, a 4-fluorophenyl group, a 2,4-difluorophenyl group, a 2,6-difluorophenyl group, a 3,4-difluorophenyl group, a 3,5-difluorophenyl group, a 2,4,6-trifluorophenyl group, a 3,4,5-trifluorophenyl group, a 2,3,5,6-tetrafluorophenyl group, a pentafluorophenyl group, a 2,3,5,6-tetrafluoro-4-trifluoromethylphenyl group, a 2,3,5,6-tetrafluoro-4-pentafluorophenylphenyl group, a perfluoro-1-naphthyl group, a perfluoro-2-naphthyl group and a 4,5,6,7,8-pentafluoro-2-naphthyl group; and halogenated aryl groups obtained by changing "fluoro" contained in the above-mentioned halogenated aryl groups to "chloro", "bromo" or "iodo".

Examples of the above-mentioned (halogenated alkyl)aryl group are a 2-(trifluoromethyl)phenyl group, a 3-(trifluoromethyl)phenyl group, a 4-(trifluoromethyl)phenyl group, a 2,6-bis(trifluoromethyl)phenyl group, a 3,5-bis(trifluoromethyl)phenyl group, and a 2,4,6-tris(trifluoromethyl)phenyl group; and (halogenated alkyl)aryl groups obtained by changing "fluoro" contained in the above-mentioned (halogenated alkyl)aryl groups to "chloro", "bromo" or "iodo".

Examples of the above-mentioned cyanated aryl group are a 2-cyanophenyl group, a 3-cyanophenyl group and a 4-cyanophenyl group.

Examples of the above-mentioned nitrated aryl group are a 2-nitrophenyl group, a 3-nitrophenyl group and a 4-nitrophenyl group.

Examples of the above-mentioned ester group are a methoxycarbonyl group, an ethoxycarbonyl group, a n-propoxycarbonyl group, an isopropoxycarbonyl group, a phenoxycarbonyl group, a trifluoromethoxycarbonyl group and a pentafluorophenoxycarbonyl group.

Examples of the above-mentioned acyl group are a formyl group, an ethanoyl group, a propanoyl group, a butanoyl group, a trifluoroethanoyl group, a benzoyl group, a pentafluorobenzoyl group, a perfluoroethanoyl group, a perfluoropropanoyl group, a perfluorobutanoyl group, a perfluoropentanoyl group, a perfluorohexanoyl group, a perfluoroheptanoyl group, a perfluorooctanoyl group, a perfluorononanoyl group, a perfluorodecanoyl group, a perfluoroundecanoyl group and a perfluorododecanoyl group.

$R^1$ in the above formula [2] is preferably a halogenated hydrocarbon group; more preferably a halogenated alkyl group or a halogenated aryl group; further preferably a fluoromethyl group, a difluoromethyl group, a trifluoromethyl group, a 2,2,2-trifluoroethyl group, a 2,2,3,3,3-pentafluoropropyl group, a 2,2,2-trifluoro-1-trifluoromethylethyl group, a 1,1-bis(trifluoromethyl)-2,2,2-trifluoroethyl group, a 2-fluorophenyl group, a 3-fluorophenyl group, a 4-fluorophenyl group, a 2,4-difluorophenyl group, a 2,6-difluorophenyl group, a 3,4-difluorophenyl group, a 3,5-difluorophenyl group, a 2,4,6-trifluorophenyl group, a 3,4,5-trifluorophenyl group, a 2,3,5,6-tetrafluorophenyl group, a pentafluorophenyl group, a 2,3,5,6-tetrafluoro-4-trifluoromethylphenyl group, a 2,3,5,6-tetrafluoro-4-pentafluorophenylphenyl group, a perfluoro-1-naphtyl group, a perfluoro-2-naphtyl group, a 4,5,6,7,8-pentafluoro-2-naphtyl group, a chloromethyl group, a dichloromethyl group, a trichloromethyl group, a 2,2,2-trichloroethyl group, a 2,2,3,3,3-pentachloropropyl group, a 2,2,2-trichloro-1-trichloromethylethyl group, a 1,1-bis(trichloromethyl)-2,2,2-trichloroethyl group, a 4-chlorophenyl group, a 2,6-dichlorophenyl group, a 3,5-dichlorophenyl group, a 2,4,6-trichlorophenyl group, a 3,4,5-trichlorophenyl group or a pentachlorophenyl group; particularly preferably a fluoroalkyl group or a fluoroaryl group; and most preferably a trifluoromethyl group, a 2,2,2-trifluoro-1-trifluoromethylethyl group, a 1,1-bis(trifluoromethyl)-2,2,2-trifluoroethyl group, a 3,5-difluorophenyl group, a 3,4,5-trifluorophenyl group or a pentafluorophenyl group.

Examples of $M^2$ in the above formula [3] are a beryllium atom, a magnesium atom, a calcium atom, a scandium atom, a titanium atom, a zirconium atom, a hafnium atom, a vanadium atom, a chromium atom, a manganese atom, an iron atom, a cobalt atom, a nickel atom, a copper atom, a zinc atom and a boron atom. Among them, preferred is a magnesium atom, a titanium atom, a zirconium atom, an iron atom, a cobalt atom, a nickel atom, a copper atom, a zinc atom or a boron atom; more preferred is a magnesium atom, a titanium atom, a zirconium atom, a zinc atom or a boron atom; and particularly preferred is a magnesium atom, a zirconium atom or a boron atom.

The hydrocarbon group of $R^2$ in the above formula [3] is preferably an alkyl group, an aryl group or an aralkyl group, and examples thereof are those exemplified for $L^1$ in the above formula [1].

Examples of the halogenated hydrocarbon group of $R^2$ in the above formula [3] are a halogenated alkyl group, a halogenated aryl group and a (halogenated alkyl)aryl group, and examples thereof are those exemplified for the electron-withdrawing group of $R^1$ in the above formula [2].

$R^2$ in the above formula [3] is preferably a methyl group, an ethyl group, a n-propyl group, an isopropyl group, a n-butyl group, a sec-butyl group, a tert-butyl group, an isobutyl group, a n-pentyl group, a neopentyl group, a n-hexyl group, a n-heptyl group, a n-octyl group, a n-decyl group, a n-dodecyl group, a n-pentadecyl group and a n-eicosyl group, a phenyl group, a 2-tolyl group, a 3-tolyl group, a 4-tolyl group, a 2,3-xylyl group, a 2,4-xylyl group, a 2,5-xylyl group, a 2,6-xylyl group, a 3,4-xylyl group, a 3,5-xylyl group, a 2,3,4-trimethylphenyl group, a 2,3,5-trimethylphenyl group, a 2,3,6-trimethylphenyl group, a 2,4,6-trimethylphenyl group, a 3,4,5-trimethylphenyl group, a 2,3,4,5-tetramethylphenyl group, a 2,3,4,6-tetramethylphenyl group, a 2,3,5,6-tetramethylphenyl group, a pentamethylphenyl group, an ethylphenyl group, a n-propylphenyl group, an isopropylphenyl group, a n-butylphenyl group, a sec-butylphenyl group, a tert-butylphenyl group, an isobutylpheny group, a n-pentylphenyl group, a neopentylphenyl group, a n-hexylphenyl group, a n-octylphenyl group, a n-decylphenyl group, a n-dodecylphenyl group, a n-tetradecylphenyl group, a naphthyl group and an anthracenyl group or a pentafluoropheny group.

Examples of J in the above formula [4] are a carbon atom and a silicon atom. Among them, preferred is a silicon atom. In the above formula [4], n is preferably 2 or 3, and more preferably 2.

The hydrocarbon group of $R^2$ in the above formula [4] is preferably an alkyl group, an aryl group or an aralkyl group, and examples thereof are those exemplified for $L^1$ in the above formula [1].

Examples of the halogenated hydrocarbon group of $R^2$ in the above formula [4] are a halogenated alkyl group, a halogenated aryl group and a (halogenated alkyl)aryl group, and examples thereof are those exemplified for the electron-withdrawing group of $R^1$ in the above formula [2].

$R^2$ in the above formula [4] is preferably a methyl group, an ethyl group, a n-propyl group, an isopropyl group, a n-butyl group, a sec-butyl group, a tert-butyl group, an isobutyl group, a n-pentyl group, a neopentyl group, a n-hexyl group, a n-heptyl group, a n-octyl group, a n-decyl group, a n-dodecyl group, a n-pentadecyl group and a n-eicosyl group, a phenyl group, a 2-tolyl group, a 3-tolyl group, a 4-tolyl group, a 2,3-xylyl group, a 2,4-xylyl group, a 2,5-xylyl group, a 2,6-xylyl group, a 3,4-xylyl group, a 3,5-xylyl group, a 2,3,4-trimethylphenyl group, a 2,3,5-trimethylphenyl group, a 2,3,6-trimethylphenyl group, a 2,4,6-trimethylphenyl group, a 3,4,5-trimethylphenyl group, a 2,3,4,5-tetramethylphenyl group, a 2,3,4,6-tetramethylphenyl group, a 2,3,5,6-tetramethylphenyl group, a pentamethylphenyl group, an ethylphenyl group, a n-propylphenyl group, an isopropylphenyl group, a n-butylphenyl group, a sec-butylphenyl group, a tert-butylphenyl group, an isobutylpheny group, a n-pentylphenyl group, a neopentylphenyl group, a n-hexylphenyl group, a n-octylphenyl group, a n-decylphenyl group, a n-dodecylphenyl group, a n-tetradecylphenyl group, a naphthyl group and an anthracenyl group or a pentafluoropheny group.

Examples of the compound (a), wherein $M^1$ in the above formula [1] is an aluminum atom, are a trialkylaluminum such as trimethylaluminum, triethylaluminum, tripropylaluminum, tri-n-butylaluminum, triisobutylaluminum, tri-n-hexylaluminum and tri-n-octylaluminum; a triarylaluminum such as triphenylaluminum, trinaphthylaluminum and tri(pentafluorophenyl)aluminum; a trialkenylaluminum such as triallylaluminum; tri(cyclopentadienyl)aluminum; a dialkylaluminum halide such as dimethylaluminum chloride, diethylaluminum chloride, dipropylaluminum chloride, di-n-butylaluminum chloride, diisobutylaluminum chloride, di-n-hexylaluminum chloride, dimethylaluminum bromide, diethylaluminum bromide, dipropylaluminum bromide, di-n-butylaluminum bromide, diisobutylaluminum bromide, di-n-hexylaluminum bromide, dimethylaluminum iodide, diethylaluminum iodide, dipropylaluminum iodide, di-n-butylaluminum iodide, diisobutylaluminum iodide and di-n-hexylaluminum iodide; an alkylaluminum dihalide such as methylaluminum dichloride, ethylaluminum dichloride, propylaluminum dichloride, n-butylaluminum dichloride, isobutylaluminum dichloride, n-hexylaluminum dichloride, n-octylaluminum dichloride, methylaluminum dibromide, ethylaluminum dibromide, propylaluminum dibromide, n-butylaluminum dibromide, isobutylaluminum dibromide, n-hexylaluminum dibromide, n-octylaluminum dibromide, methylaluminum diiodide, ethylaluminum diiodide, propylaluminum diiodide, n-butylaluminum diiodide, isobutylaluminum diiodide, n-hexylaluminum diiodide and n-octylaluminum diiodide; and an aluminum halide such as aluminum fluoride, aluminum chloride, aluminum bromide and aluminum iodide.

The compound (a) is preferably a trialkylaluminum; more preferably trimethylaluminum, triethylaluminum, tripropylaluminum, tri-n-butylaluminum, triisobutylaluminum, tri-n-hexylaluminum or tri-n-octylaluminum; and particularly preferably trimethylaluminum, triethylaluminum, triisobutylaluminum or tri-n-octylaluminum. Among them, preferred is triethylaluminum.

Examples of an amine of the compound (b) represented by the above formula [2] are di(fluoromethyl)amine, di(chloromethyl)amine, di(bromomethyl)amine, di(iodomethyl)amine, bis(difluoromethyl)amine, bis(dichloromethyl)amine, bis(dibromomethyl)amine, bis(diiodomethyl)amine, bis(trifluoromethyl)amine, bis(trichloromethyl)amine, bis(tribromomethyl)amine, bis(triiodomethyl)amine, bis(2,2,2-trifluoroethyl)amine, bis(2,2,2-trichloroethyl)amine, bis(2,2,2-tribromoethyl)amine, bis(2,2,2-triiodoethyl)amine, bis(2,2,3,3,3-pentafluoropropyl)amine, bis(2,2,3,3,3-pentachloropropyl)amine, bis(2,2,3,3,3-pentabromopropyl)amine, bis(2,2,3,3,3-pentaiodopropyl)amine, bis(2,2,2-trifluoro-1-trifluoromethylethyl)amine, bis(2,2,2-trichloro-1-trichloromethylethyl)amine, bis(2,2,2-tribromo-1-tribromomethylethyl)amine, bis(2,2,2-triiodo-1-triiodomethylethyl)amine, bis(1,1-bis(trifluoromethyl)-2,2,2-trifluoroethyl)amine, bis(1,1-bis(trichloromethyl)-2,2,2-trichloroethyl)amine, bis(1,1-bis(tribromomethyl)-2,2,2-tribromoethyl)amine, bis(1,1-bis(triiodomethyl)-2,2,2-triiodoethyl)amine, bis(2-fluorophenyl)amine, bis(3-fluorophenyl)amine, bis(4-fluorophenyl)amine, bis(2-chlorophenyl)amine, bis(3-chlorophenyl)amine, bis(4-chlorophenyl)amine, bis(2-bromophenyl)amine, bis(3-bromophenyl)amine, bis(4-bromophenyl)amine, bis(2-iodophenyl)amine, bis(3-iodophenyl)amine, bis(4-iodophenyl)amine, bis(2,6-difluorophenyl)amine, bis(3,5-difluorophenyl)amine, bis(2,6-dichlorophenyl)amine, bis(3,5-dichlorophenyl)amine, bis(2,6-dibromophenyl)amine, bis(3,5-dibromophenyl)amine, bis(2,6-diiodophenyl)amine, bis(3,5-diiodophenyl)amine, bis(2,4,6-trifluorophenyl)amine, bis(2,4,6-trichlorophenyl)amine, bis(2,4,6-tribromophenyl)amine, bis(2,4,6-triiodophenyl)amine, bis(3,4,5-trifluorophenyl)amine, bis(3,4,5-trichlorophenyl)amine, bis(3,4,5-tribromophenyl)amine, bis(3,4,5-triiodophenyl)amine, bis(pentafluorophenyl)amine, bis(pentachlorophenyl)amine, bis(pentabromophenyl)amine, bis(pentaiodophenyl)amine, bis(2-(trifluoromethyl)phenyl)amine, bis(3-(trifluoromethyl)phenyl)amine, bis(4-(trifluoromethyl)phenyl)amine, bis(2,6-di(trifluoromethyl)phenyl)amine, bis(3,5-di(trifluoromethyl)phenyl)amine, bis(2,4,6-tri(trifluoromethyl)phenyl)amine, bis(2-cyanophenyl)amine, bis(3-cyanophenyl)amine, bis(4-cyanophenyl)amine, bis(2-nitrophenyl)amine, bis(3-nitrophenyl)amine, bis(4-nitrophenyl)amine, bis(1H,1H-perfluorobutyl)amine, bis(1H,1H-perfluoropentyl)amine, bis(1H,1H-perfluorohexyl)amine, bis(1H,1H-perfluorooctyl)amine, bis(1H,1H-perfluorododecyl)amine, bis(1H,1H-perfluoropentadecyl)amine, bis(1H,1H-perfluoroeicosyl)amine, bis(1H,1H-perchlorobutyl)amine, bis(1H,1H-perchloropentyl)amine, bis(1H,1H-perchlorohexyl)amine, bis(1H,1H-perchlorooctyl)amine, bis(1H,1H-perchlorododecyl)amine, bis(1H,1H-perchloropentadecyl)amine, bis(1H,1H-perchloroeicosyl)amine, bis(1H,1H-perbromobutyl)amine, bis(1H,1H-perbromopentyl)amine, bis(1H,1H-perbromohexyl)amine, bis(1H,1H-perbromooctyl)amine, bis(1H,1H-perbromododecyl)amine, bis(1H,1H-perbromopentadecyl)amine and bis(1H,1H-perbromoeicosyl)amine; and phosphine compounds obtained by replacing the nitrogen atom contained in each of the above-mentioned amines with a phosphorus atom, each of said phosphine compounds having a name obtained by changing "amine" contained in each of the above-mentioned amines to "phosphine".

Examples of an alcohol of the compound (b) represented by the above formula [2] are fluoromethanol, chloromethanol, bromomethanol, iodomethanol, difluoromethanol, dichloromethanol, dibromomethanol, diiodomethanol, trifluoromethanol, trichloromethanol, tribromomethanol, triiodomethanol, 2,2,2-trifluoroethanol, 2,2,2-trichloroethanol, 2,2,2-tribromoethanol, 2,2,2-triiodoethanol, 1,1,1,3,3,3-hexafluoro-2-propanol, 1,1,1,3,3,3-hexachloro-2-propanol, 1,1,1,3,3,3-hexabromo-2-propanol, 1,1,1,3,3,3-hexaiodo-2-propanol, 1,1,1,3,3,3-hexafluoro-2-(trifluoromethyl)-2-propanol, 1,1,1,3,3,3-hexachloro-2-(trichloromethyl)-2-propanol, 1,1,1,3,3,3-hexabromo-2-(tribromomethyl)-2-propanol, 1,1,1,3,3,3-hexaiodo-2-(triiodomethyl)-2-propanol, 1H,1H,3H-perfluoropropanol, 1H,1H,3H-perchloropropanol, 1H,1H,3H-perbromopropanol, 1H,1H,3H-periodopropanol, 1H,1H-perfluoropropanol, 1H,1H-perchloropropanol, 1H,1H-perbromopropanol, 1H,1H-periodopropanol, 1H,1H,4H-perfluorobutanol, 1H,1H,4H-perchlorobutanol, 1H,1H,4H-perbromobutanol, 1H,1H,4H-periodobutanol, 1H,1H-perfluorobutanol, 1H,1H-perchlorobutanol, 1H,1H-perbromobutanol, 1H,1H-periodobutanol, 1H,1H,5H-perfluoropentanol, 1H,1H,5H-perchloropentanol, 1H,1H,5H-perbromopentanol, 1H,1H,5H-periodopentanol, 1H,1H-perfluoropentanol, 1H,1H-perchloropentanol, 1H,1H-perbromopentanol, 1H,1H-periodopentanol, 1H,1H,6H-perfluorohexanol, 1H,1H,6H-perchlorohexanol, 1H,1H,6H-perbromohexanol, 1H,1H,6H-periodohexanol, 1H,1H-perfluorohexanol, 1H,1H- perchlorohexanol, 1H,1H-perbromohexanol, 1H,1H-periodohexanol, 1H,1H,8H-perfluorooctanol, 1H,1H,8H-perchlorooctanol, 1H,1H,8H-perbromooctanol, 1H,1H,8H-periodooctanol, 1H,1H-perfluorooctanol, 1H,1H-perchlorooctanol, 1H,1H-perbromooctanol and 1H,1H-periodooctanol; and thiol compounds obtained by replacing the oxygen atom contained in each of the above-mentioned alcohols with a sulfur atom, each of said thiol compounds having a name obtained by changing "ol" contained in each of the above-mentioned alcohols to "thiol".

Examples of a phenol of the compound (b) represented by the above formula [2] are 2-fluorophenol, 3-fluorophenol, 4-fluorophenol, 2,4-difluorophenol, 2,6-difluorophenol, 3,4-difluorophenol, 3,5-difluorophenol, 2,4,6-trifluorophenol, 2,3,5,6-tetrafluorophenol, pentafluorophenol, 2,3,5,6-tetrafluoro-4-trifluoromethylphenol, 2,3,5,6-tetrafluoro-4-pentafluorophenylphenol, perfluoro-1-naphthol, perfluoro-2-naphthol, 4,5,6,7,8-pentafluoro-2-naphthol, 2-chlorophenol, 3-chlorophenol, 4-chlorophenol, 2,4-dichlorophenol, 2,6-dichlorophenol, 3,4-dichlorophenol, 3,5-dichlorophenol, 2,4,6-trichlorophenol, 3,4,5-trichlorophenol, 2,3,5,6-tetrachlorophenol, pentachlorophenol, 2,3,5,6-tetrachloro-4-trichloromethylphenol, 2,3,5,6-tetrachloro-4-pentachlorophenylphenol, perchloro-1-naphthol, perchloro-2-naphthol, 4,5,6,7,8-pentachloro-2-naphthol, 2-bromophenol, 3-bromophenol, 4-bromophenol, 2,4-dibromophenol, 2,6-dibromophenol, 3,4-dibromophenol, 3,5-dibromophenol, 2,4,6-tribromophenol, 3,4,5-tribromophenol, 2,3,5,6-tetrabromophenol, pentabromophenol, 2,3,5,6-tetrabromo-4-tribromo-methylphenol, 2,3,5,6-tetrabromo-4-pentabromophenylphenol, perbromo-1-naphthol, perbromo-2-naphthol, 4,5,6,7,8-pentabromo-2-naphthol, 2-iodophenol, 3-iodophenol, 4-iodophenol, 2,4-diiodophenol, 2,6-diiodophenol, 3,4-diiodophenol, 3,5-diiodophenol, 2,4,6-triiodophenol, 3,4,5-triiodophenol, 2,3,5,6-tetraiodophenol, pentaiodophenol, 2,3,5,6-tetraiodo-4-triiodomethylphenol, 2,3,5,6-tetraiodo-4-pentaiodophenylphenol, periodo-1-naphthol, periodo-2-naphthol, -(trifluoromethyl)phenol, 4-(trifluoromethyl)phenol, 2,6-bis(trifluoromethyl)phenol, 3,5-bis(trifluoromethyl)phenol, 2,4,6-tris(trifluoromethyl) phenol, 2-cyanophenol, 3-cyanophenol, 4-cyanophenol, 2-nitrophenol, 3-nitrophenol and 4-nitrophenol; and thiophenol compounds obtained by replacing the oxygen atom contained in each of the above-mentioned phenols with a sulfur atom, each of said thiophenol compounds having a name obtained by changing "phenol" contained in each of the above-mentioned phenols to "thiophenol".

Examples of a halogenated carboxylic acid of the compound (b) represented by the above formula [2] are pentafluorobenzoic acid, perfluoroethanoic acid, perfluoropropanoic acid, perfluorobutanoic acid, perfluoropentanoic acid, perfluorohexanoic acid, perfluoroheptanoic acid, perfluorooctanoic acid, perfluorononanoic acid, perfluorodecanoic acid, perfluoroundecanoic acid and perfluorododecanoic acid.

The compound (b) is preferably, as an amine, bis(trifluoromethyl)amine, bis(2,2,2-trifluoroethyl)amine, bis(2,2,3,3,3-pentafluoropropyl)amine, bis(2,2,2-trifluoro-1-trifluoromethylethyl)amine, bis(1,1-bis(trifluoromethyl)-2,2,2-trifluoroethyl)amine or bis(pentafluorophenyl)amine; as an alcohol, trifluoromethanol, 2,2,2-trifluoroethanol, 1,1,1,3,3,3-hexafluoro-2-propanol, 1,1,1,3,3,3-hexafluoro-2-(trifluoromethyl)-2-propanol, 1H,1H,6H-perfluorohexanol, 1H,1H-perfluorohexanol, 1H,1H,8H-perfluorooctanol or 1H,1H-perfluorooctanol; and, as a phenol, 2-fluorophenol, 3-fluorophenol, 4-fluorophenol, 2,6-difluorophenol, 3,5-difluorophenol, 2,4,6-trifluorophenol, 3,4,5-trifluorophenol, pentafluorophenol, 2-(trifluoromethyl)phenol, 3-(trifluoromethyl)phenol, 4-(trifluoromethyl)phenol, 2,6-bis(trifluoromethyl)phenol, 3,5-bis(trifluoromethyl)phenol or 2,4,6-tris(trifluoromethyl)phenol.

The compound (b) is more preferably bis(trifluoromethyl) amine, bis(pentafluorophenyl)amine, trifluoromethanol, 1,1,1,3,3,3-hexafluoro-2-propanol, 1,1,1,3,3,3-hexafluoro-2-(trifluoromethyl)-2-propanol, 2,6-difluorophenol, 3,5-difluorophenol, 2,4,6-trifluorophenol, 3,4,5-trifluorophenol, pentafluorophenol, 4-(trifluoromethyl)phenol, 2,6-bis(trifluoromethyl)phenol or 2,4,6-tris(trifluoromethyl)phenol; and further preferably 1,1,1,3,3,3-hexafluoro-2-propanol, 1,1,1,3,3,3-hexafluoro-2-(trifluoromethyl)-2-propanol, 3,5-difluorophenol, 3,4,5-trifluorophenol or pentafluorophenol.

Examples of the compound (c) represented by the above formula [3] are beryllium hydroxide, magnesium hydroxide, calcium hydroxide, titanium hydroxide, zirconium hydroxide, hafnium hydroxide, iron hydroxide, cobalt hydroxide, nickel hydroxide, copper hydroxide, zinc hydroxide, boric acid, methylboronic acid, phenylboronic acid, and pentafluorophenylboronic acid. Among them, preferred is magnesium hydroxide, titanium hydroxide, zirconium hydroxide, zinc hydroxide, boric acid, methylboronic acid, phenylboronic acid or pentafluorophenylboronic acid.

Examples of the compound (e) are dimethylsilanediol, diethylsilanediol, di(n-propyl)silanediol, diisopropylsilanediol, di(n-butyl)silanediol, di(sec-butyl)silanediol, di(tert-butyl)silanediol, diisobutylsilanediol, di(n-pentyl)silanediol, dineopentylsilanediol, di(n-hexyl)silanediol, di(n-heptyl)silanediol, di(n-octyl)silanediol, di(n-decyl)silanediol, di(n-dodecyl)silanediol, di(n-pentadecyl) silanediol, di(n-eicosyl)silanediol, diphenylsilanediol, di(2-tolyl)silanediol, di(3-tolyl)silanediol, di(4-tolyl)silanediol, di(2,3-xylyl)silanediol, di(2,4-xylyl)silanediol, di(2,5-xylyl) silanediol, di(2,6-xylyl)silanediol, di(3,4-xylyl)silanediol, di(3,5-xylyl)silanediol, di(2,3,4-trimethylphenyl)silanediol, di(2,3,5-trimethylphenyl)silanediol, di(2,3,6-trimethylphenyl)silanediol, di(2,4,6-trimethylphenyl)silanediol, di(3,4,5-trimethylphenyl)silanediol, di(2,3,4,5-tetramethylphenyl)silanediol, di(2,3,4,6-tetramethylphenyl)silanediol, di(2,3,5,6-tetramethylphenyl)silanediol, di(pentamethylphenyl) silanediol, di(ethylphenyl)silanediol, di(n-propylphenyl) silanediol, di(isopropylphenyl)silanediol, di(n-butylphenyl) silanediol, di(sec-butylphenyl)silanediol, di(tert-butylphenyl)silanediol, di(isobutylphenyl)silanediol, di(n-pentylphenyl)silanediol, di(neopentylphenyl)silanediol, di(n-hexylphenyl)silanediol, di(n-octylphenyl)silanediol, di(n-decylphenyl)silanediol, di(n-dodecylphenyl)silanediol, di(n-tetradecylphenyl)silanediol, dinaphthylsilanediol, dianthracenylsilanediol, methylsilanetriol, ethylsilanetriol, n-propylsilanetriol, isopropylsilanetriol, n-butylsilanetriol, sec-butylsilanetriol, tert-butylsilanetriol, isobutylsilanetriol, n-pentylsilanetriol, neopentylsilanetriol, n-hexylsilanetriol, n-heptylsilanetriol, n-octylsilanetriol, n-decylsilanetriol, n-dodecylsilanetriol, n-pentadecylsilanetriol, n-eicosylsilanetriol, phenylsilanetriol, 2-tolylsilanetriol, 3-tolylsilanetriol, 4-tolylsilanetriol, 2,3-xylylsilanetriol, 2,4-xylylsilanetriol, 2,5-xylylsilanetriol, 2,6-xylylsilanetriol, 3,4-xylylsilanetriol, 3,5-xylylsilanetriol, 2,3,4-trimethylphenylsilanetriol, 2,3,5-trimethylphenylsilanetriol, 2,3,6-trimethylphenylsilanetriol, 2,4,6-trimethylphenylsilanetriol, 3,4,5-trimethylphenylsilanetriol, 2,3,4,5-tetramethylphenylsilanetriol, 2,3,4,6-tetramethylphenylsilanetriol, 2,3,5,6-tetramethylphenylsilanetriol, pentamethylphenylsilanetriol, ethylphenylsilanetriol, n-propylphenylsilanetriol, isopropylphenylsilanetriol, n-butylphenylsilanetriol, sec-butylphenylsilanetriol, tert-butylphenylsilanetriol, isobutylphenylsilanetriol, n-pentylphenylsilanetriol, neopentylphenylsilanetriol, n-hexylphenylsilanetriol, n-octylphenylsilanetriol, n-decylphenylsilanetriol, n-dodecylphenylsilanetriol, n-tetradecylphenylsilanetriol, naphthylsilanetriol, anthracenylsilanetriol, tetrahydroxysilane, pentafluorophenylsilanetriol and di(pentafluorophenyl)silanediol.

Among them, the compound (e) is preferably dimethylsilanediol, diethylsilanediol, diisopropylsilanediol, di(tert-butyl)silanediol, diphenylsilanediol, di(2-tolyl)silanediol, di(3-tolyl)silanediol, di(4-tolyl)silanediol, di(2,4,6-trimethylphenyl)silanediol, tetrahydroxysilane, pentafluorophenylsilanetriol or di(pentafluorophenyl)silanediol; and most preferably diphenylsilanediol.

The particle (d) is preferably a particle generally used as a carrier, and among them, preferred is a porous material having a uniform particle diameter. The particle (d) is preferably an inorganic material or an organic polymer, and more preferably an inorganic material.

From a viewpoint of a particle-diameter distribution of an addition polymer obtained, a geometric standard deviation of the particle (d), which is based on a volume of the particle (d), is preferably 2.5 or less, more preferably 2.0 or less, and further preferably 1.7 or less.

Examples of the above-mentioned inorganic material are an inorganic oxide, clay and a clay mineral, and a combination of two or more thereof. Among them, preferred is an inorganic oxide.

Examples of the above-mentioned inorganic oxide are $SiO_2$, $Al_2O_3$, MgO, $ZrO_2$, $TiO_2$, $B_2O_3$, CaO, ZnO, BaO and $ThO_2$, and a combination of two or more thereof such as $SiO_2$—MgO, $SiO_2$—$Al_2O_3$, $SiO_2$—$TiO_2$, $SiO_2$—$V_2O_5$, $SiO_2$—$Cr_2O_3$ and $SiO_2$—$TiO_2$—MgO. Among them, preferred is $SiO_2$, $Al_2O_3$ or a combination thereof; and particularly preferred is $SiO_2$ (silica). The above-mentioned inorganic oxides may contain a small amount of carbonates, sulfates, nitrates or oxide components such as $Na_2CO_3$, $K_2CO_3$, $CaCO_3$, $MgCO_3$, $Na_2SO_4$, $Al_2(SO_4)_3$, $BaSO_4$, $KNO_3$, $Mg(NO_3)_2$, $Al(NO_3)_3$, $Na_2O$, $K_2O$ and $Li_2O$.

Examples of the above-mentioned clay or clay mineral are kaolin, bentonite, knot clay, gaerome clay, allophane, hisingerite, pyrophylite, talc, a mica group, a montmorillnite group, vermiculite, a chlorite group, palygorskite, kaolinite, nacrite, dickite, halloycite, smectite, hectorite, and raponite, saponite. Among them, preferred is smectite, montmorillnite, hectorite, raponite or saponite; and further preferred is montmorillnite or hectorite.

The above-mentioned inorganic material is preferably dried so as to be free from moisture, and among them, preferred is an inorganic material thermally dried. A heating temperature for an inorganic material, whose moisture content cannot be visually confirmed, is usually 100 to 1,500° C., preferably 100 to 1,000° C., and further preferably 200 to 800° C. A heating time is not particularly limited, and preferably 10 minutes to 50 hours, more preferably 1 to 30 hours. Examples of a method for drying are (1) a method comprising the step of flowing a dried inert gas such as nitrogen and argon at a constant flow rate, and (2) a method comprising the step of drying under a reduced pressure.

An average particle diameter of the inorganic material is preferably 5 to 1,000 µm, more preferably 10 to 500 µm, and further preferably 10 to 100 µm; a pore volume thereof is preferably 0.1 ml/g or more, and more preferably 0.3 to 10 ml/g; and a specific surface area thereof is preferably 10 to 1,000 m²/g, and more preferably 100 to 500 m²/g.

The above-mentioned organic polymer as the particle (d) is not particularly limited in its kind, and a combination of two or more kinds of organic polymers may be used. The organic polymer contains preferably an active hydrogen-carrying functional group, or a non-proton-donating Lewis basic functional group, wherein the term "active hydrogen-carrying functional group" means a functional group having an active hydrogen, and the term "non-proton-donating Lewis basic functional group" means a Lewis basic functional group donating no proton.

The above-mentioned active hydrogen-carrying functional group is not particularly limited in its kind. Examples thereof are a primary amino group, a secondary amino group, an imino group, an amide group, a hydrazide group, an amidino group, a hydroxyl group, a hydroperoxy group, a carboxyl group, a formyl group, a carbamoyl group, a sulfonic acid group, a sulfinic acid group, a sulfenic acid group, a thiol group, a thioformyl group, a pyrrolyl group, an imidazolyl group, a piperidyl group, an indazolyl group and a carbazolyl group. Among them, preferred is a primary amino group, a secondary amino group, an imino group, an amide group, an imide group, a hydroxy group, a formyl group, a carboxyl group, a sulfonic acid group or a thiol group; and particularly preferred is a primary amino group, a secondary amino group, an amide group or a hydroxyl group. One or more hydrogen atoms contained in these groups may be substituted with a halogen atom or a hydrocarbon group having 1 to 20 carbon atoms.

The above-mentioned non-proton-donating Lewis basic functional group is not particularly limited in its kind, as far as it is a functional group having a Lewis base portion, which does not contain an active hydrogen atom. Examples thereof are a pyridyl group, an N-substituted imidazolyl group, an N-substituted indazolyl group, a nitrile group, an azido group, an N-substituted imino group, an N,N-substituted amino group, an N,N-substituted aminoxy group, an N,N,N-substituted hydrazino group, a nitroso group, a nitro group, a nitroxy group, a furyl group, a carbonyl group, a thiocarbonyl group, an alkoxy group, an alkyloxycarbonyl group, an N,N-substituted carbamoyl group, a thioalkoxy group, a substituted sulfinyl group, a substituted sulfonyl group and a substituted sulfonic acid group. Among them, preferred is a heterocyclic group; more preferred is an aromatic heterocyclic group having an oxygen atom, a nitrogen atom or those both atoms in its ring; particularly preferred is a pyridyl group, an N-substituted imidazolyl group or an N-substituted indazoyl group; and most preferred is a pyridyl group. One or more hydrogen atoms contained in these groups may be substituted with a halogen atom or a hydrocarbon group having 1 to 20 carbon atoms.

An amount of the above-mentioned active hydrogen-carrying functional group, or the above-mentioned non-proton-donating Lewis basic functional group contained in the above-mentioned organic polymer is not particularly limited, and said amount is preferably 0.01 to 50 mmol-functional group/g-organic polymer, and more preferably 0.1 to 20 mmol-functional group/g-organic polymer.

Examples of a process for producing the above-mentioned organic polymer containing the active hydrogen-carrying functional group, or the non-proton-donating Lewis basic functional group are (1) a process comprising the step of homopolymerizing a monomer having said functional group and at least one polymerizable unsaturated group, and (2) a process comprising the step of copolymerizing said monomer with other monomer having a polymerizable unsaturated group. Each of those monomers may be combined with a crosslinking-polymerizable monomer having two or more polymerizable unsaturated groups.

Examples of the above-mentioned polymerizable unsaturated group are an alkenyl group such as a vinyl group and an allyl group; and an alkynyl group such as an ethyne group.

Examples of the above-mentioned monomer having an active hydrogen-carrying functional group and at least one polymerizable unsaturated group are a primary amine, a secondary amine, an amide compound and a hydroxyl compound, all of which contain a vinyl group. Specific examples of said monomer are N-(1-ethenyl)amine, N-(2-propenyl)amine, N-(1-ethenyl)-N-methylamine, N-(2-propenyl)-N-methylamine, 1-ethenylamide, 2-propenylamide, N-methyl-(1-ethenyl)amide, N-methyl-(2-propenyl)amide, vinyl alcohol, 2-propen-1-ol and 3-buten-1-ol.

Examples of the above-mentioned monomer having a non-proton-donating Lewis basic functional group and at least one polymerizable unsaturated group are vinylpyridine, vinyl(N-substituted)imidazole and vinyl(N-substituted)indazole.

Examples of the above-mentioned other monomer having a polymerizable unsaturated group are ethylene; an α-olefin such as propylene, 1-butene, 1-hexene and 4-methyl-1-pentene; and an aromatic vinyl compound such as styrene. Among them, preferred is ethylene or styrene. The above-mentioned monomers may be used in combination of two or more thereof.

An example of the above-mentioned crosslinking-polymerizable monomer having two or more polymerizable unsaturated groups is divinylbenzene.

An average particle diameter of the above-mentioned organic polymer is preferably 5 to 1,000 μm, and more preferably 10 to 500 μm; a pore volume thereof is preferably 0.1 ml/g or more, and more preferably 0.3 to 10 ml/g; and a specific surface area thereof is preferably 10 to 1,000 $m^2/g$, and more preferably 50 to 500 $m^2/g$.

The above-mentioned organic polymer is preferably dried so as to be free from moisture, and among them, preferred is an organic polymer thermally dried. A heating temperature for an organic polymer, whose moisture content cannot be visually confirmed, is usually 30 to 400° C., preferably 50 to 200° C., and further preferably 70 to 150° C. A heating time is not particularly limited, and preferably 10 minutes to 50 hours, more preferably 1 to 30 hours. Examples of a method for drying are (1) a method comprising the step of flowing a dried inert gas such as nitrogen and argon at a constant flow rate, and (2) a method comprising the step of drying under a reduced pressure.

In order to produce an addition polymer having a further high molecular weight, the particle (d) is preferably contacted with a compound represented by the following formula [5]:

$$(R^3{}_3Si)_s X^1 \quad [5]$$

wherein $R^3$ is a hydrogen atom or a hydrocarbon group, and three $R^3$s are the same as, or different from one another; s is 1 or 2; and $X^1$ is a halogen atom or a group represented by the formula —$OR^{13}$ or —$NR^{13}{}_2$ in case that s is 1, and is a group represented by the formula —$N(R^{13})$— in case that s is 2, wherein $R^{13}$ is a hydrogen atom or a hydrocarbon group.

Each of the hydrocarbon group of $R^3$ in the formula [5] and that of $R^{13}$ is preferably an alkyl group, an aryl group or an aralky group; and more preferably an alkyl group. Examples of said alkyl, aryl and aralky groups are those above-exemplified for $L^1$ in the above formula [1].

An example of the compound represented by the above formula [5] is a compound generally known as a silylation agent such as chlorosilane and silylamine.

The compound represented by the above formula [5] is preferably trimethylchlorosilane, triethylchlorosilane, tripropylchlorosilane, tributylchlorosilane, triphenylchlorosilane, hexamethyldisilazane, trimethylsilyldimethylamine or trimethylsilyldiethylamine; and more preferably trimethylchlorosilane, triphenylchlorosilane, hexamethyldisilazane or trimethylsilyldimethylamine.

The compound represented by the above formula [5] is used in an amount of usually 0.05 to 50 mmol, preferably 0.1 to 10 mmol, and further preferably 0.2 to 5 mmol, per 1 g of the particle (d).

The particle (d) is contacted with the compound represented by the above formula [5] usually with or without a solvent. Examples of the solvent are those exemplified below for a solvent used in the process for producing a modified particle of the present invention. A contact temperature is usually −100 to 300° C., and preferably −80 to 200° C. A contact time is usually 1 minute to 200 hours, and preferably 10 minutes to 100 hours.

A particle obtained by the above-mentioned contact is usually washed with a solvent, and then, is used in the process for producing a modified particle of the present invention.

An order in contacting the compound (a), the compound (b), the compound (c) (or the compound (e)) and the particle (d) is not particularly limited. Examples of said order are:

(1) an order comprising the steps of (i) contacting the compound (a) with the compound (b) to produce a first contact product, (ii) contacting the first contact product with the compound (c) (or the compound (e)) to produce a second contact product, and then, (iii) contacting the second contact product with the particle (d);

(2) an order comprising the steps of (i) contacting the compound (a) with the compound (b) to produce a first contact product, (ii) contacting the first contact product with the particle (d) to produce a second contact product, and then, (iii) contacting the second contact product with the compound (c) (or the compound (e));

(3) an order comprising the steps of (i) contacting the compound (a) with the compound (c) (or the compound (e)) to produce a first contact product, (ii) contacting the first contact product with the compound (b) to produce a second contact product, and then, (iii) contacting the second contact product with the particle (d);

(4) an order comprising the steps of (i) contacting the compound (a) with the compound (c) (or the compound (e)) to produce a first contact product, (ii) contacting the first contact product with the particle (d) to produce a second contact product, and then, (iii) contacting the second contact product with the compound (b);

(5) an order comprising the steps of (i) contacting the compound (a) with the particle (d) to produce a first contact product, (ii) contacting the first contact product with the compound (b) to produce a second contact product, and then, (iii) contacting the second contact product with the compound (c) (or the compound (e));

(6) an order comprising the steps of (i) contacting the compound (a) with the particle (d) to produce a first contact product, (ii) contacting the first contact product with the compound (c) (or the compound (e)) to produce a second contact product, and then, (iii) contacting the second contact product with the compound (b);

(7) an order comprising the steps of (i) contacting the compound (b) with the compound (c) (or the compound (e)) to produce a first contact product, (ii) contacting the first contact product with the compound (a) to produce a second contact product, and then, (iii) contacting the second contact product with the particle (d);

(8) an order comprising the steps of (i) contacting the compound (b) with the compound (c) (or the compound (e)) to produce a first contact product, (ii) contacting the first contact product with the particle (d) to produce a second contact product, and then, (iii) contacting the second contact product with the compound (a);

(9) an order comprising the steps of (i) contacting the compound (b) with the particle (d) to produce a first contact product, (ii) contacting the first contact product with the compound (a) to produce a second contact product, and then, (iii) contacting the second contact product with the compound (c) (or the compound (e));

(10) an order comprising the steps of (i) contacting the compound (b) with the particle (d) to produce a first contact product, (ii) contacting the first contact product with the compound (c) (or the compound (e)) to produce a second contact product, and then, (iii) contacting the second contact product with the compound (a);

(11) an order comprising the steps of (i) contacting the compound (c) (or the compound (e)) with the particle (d) to produce a first contact product, (ii) contacting the first contact product with the compound (a) to produce a second contact product, and then, (iii) contacting the second contact product with the compound (b); and

(12) an order comprising the steps of (i) contacting the compound (c) (or the compound (e)) with the particle (d) to produce a first contact product, (ii) contacting the first contact product with the compound (b) to produce a second contact product, and then, (iii) contacting the second contact product with the compound (a).

Among the above-mentioned orders (1) to (12), preferred is the order (1), (2), (3), (5), (9), (11) or (12); more preferred is the order (2), (5), (9), (11) or (12); and particularly preferred is the order (2), (5) or (9).

The above-mentioned contacts are carried out with or without a solvent, preferably in an atmosphere of an inert gas. A contact temperature is usually −100 to 300° C., and preferably −80 to 200° C. A contact time is usually 1 minute to 200 hours, and preferably 10 minutes to 100 hours.

The above-mentioned solvent is usually inert to the compounds (a), (b) and (c) (or the compound (e)), the particle (d), and the first and second contact products. However, in the above-mentioned orders (1) to (12) comprising three steps (i) to (iii), even a solvent, which is active (not inert) in one or two steps of said three steps, can be used in the remaining one or two steps, provided that said solvent is inert in said remaining one or two steps; namely, solvents used in said three steps are the same as, or different from one another.

Examples of the above-mentioned solvent are a non-polar solvent such as an aliphatic hydrocarbon solvent and an aromatic hydrocarbon solvent, and a polar solvent such as a halide solvent, an ether solvent, a carbonyl solvent, a phosphoric acid derivative, a nitrile solvent, a nitro compound, an amine solvent and a sulfur compound. Specific examples thereof are an aliphatic hydrocarbon solvent such as butane, pentane, hexane, heptane, octane, decane, 2,2,4-trimethylpentane and cyclohexane; an aromatic hydrocarbon solvent such as benzene, toluene and xylene; a halide solvent such as dichloromethane, difluoromethane, chloroform, 1,2-dichloroethane, 1,2-dibromoethane, 1,1,2-trichloro-1,2,2-trifluoroethane, tetrachloroethylene, chlorobenzene, bromobenzene and o-dichlorobenzene; an ether solvent such as dimethyl ether, diethyl ether, diisopropyl ether, di-n-butyl ether, methyl-tert-butyl ether, anisole, 1,4-dioxane, 1,2-dimethoxyethane, bis(2-methoxyethyl)ether, tetrahydrofuran and tetrahydropyran; a carbonyl solvent such as acetone, ethyl methyl ketone, cyclohexanone, acetic anhydride, ethyl acetate, butyl acetate, ethylene carbonate, propylene carbonate, N,N-dimethylformamide, N,N-dimethylacetamide and N-methyl-2-pyrrolidone; a phosphoric acid derivative such as hexamethylphosphate triamide and triethyl phosphate; a nitrile solvent such as acetonitrile, propionitrile, succinonitrile and benzonitrile; a nitro compound such as nitromethane and nitrobenzene; an amine solvent such as pyridine, piperidine and morpholine; and a sulfur compound such as dimethylsulfoxide and sulfolane.

Among the above-mentioned non-polar and polar solvents, the non-polar solvent is preferable. A possible reason for this is that the contact product formed by contacting the compounds (a), (b) and (c) (or (e)) with one another usually has a low solubility in a non-polar solvent, and therefore, when said contact product and the particle (d) exist in a reaction system at the same time, said contact product is more stable in its precipitation on the surface of the particle (d) than in its existence in the non-polar solvent, and as a result, said contact product is easily fixed on the surface of the particle (d).

Respective amounts used of the above-mentioned compounds (a), (b) and (c) (or (e)) are not particularly limited. The compound (b) is used in an amount of preferably 0.01 to 2.99 mol, more preferably 0.10 to 2.80 mol, further preferably 0.20 to 2.50 mol, and most preferably 0.25 to 1.75 mol. From those amounts used of the compound (b) and the following formula (1), a preferable, more preferable, further preferable and most preferable amount used of the compound (c) (or (e)) per 1 mol of the compound (a) are calculated, respectively:

$$\text{(molar amount of the compound }(c)\text{ (or }(e))\geq[3\times(\text{molar amount of the compound }(a))-(\text{molar amount of the compound }(b))]/2 \quad (1).$$

The compound (a) is used in an amount of preferably 0.1 milligram atom or more, and more preferably 0.5 to 20 milligram atom in terms of an amount of an atom of Group 13 contained in 1 g of the modified particle produced, wherein said atom of Group 13 contained in the modified particle originates from the compound (a).

In order to promote the reaction among the compounds (a), (b) and (c) (or (e)) and the particle (d), it is preferable to add a step of heating at a higher temperature to the step of contacting. An example of said step of heating is the step comprising the sub-steps of (i) substituting the solvent contained in the reaction mixture obtained in the step of contacting with a solvent having a boiling point higher than that of the above-mentioned solvent contained in the reaction mixture, thereby obtaining a mixture, and then, (ii) heating the mixture.

Also, in order to promote the above-mentioned reaction, by-products contained in the reaction mixture are preferably removed in the step of contacting or in the above-mentioned step of heating according to a method depending upon physical properties of said by-products. Examples of said method are (1) a method comprising the step of removing a gaseous by-product through a gas-removing apparatus installed in a reactor, and (2) a method comprising the steps of (i) heating a liquid by-product to a temperature higher than its boiling point to vaporize it, and then, (ii) removing the resultant gaseous by-product through the above-mentioned gas-removing apparatus.

The modified particle produced by the process of the present invention may contain a starting material remaining unreacted, namely, the compound (a), the compound (b), the compound (c) (or the compound (e)) or the particle (d) remaining unreacted. However, when said modified particle is used for the component (A) in the present invention, it is preferable to add a step of washing with a solvent in an atmosphere of an inert gas, in order to remove said starting material remaining unreacted. Said solvent is the same as, or different from that used in the above-mentioned step of contacting. A temperature in said step of washing is usually −100 to 300° C., and preferably −80 to 200° C. A time in said step of washing is usually 1 minute to 200 hours, and preferably 10 minutes to 100 hours.

It is preferable to add a step of removing a solvent and a step of drying to the above-mentioned step of washing. Said step of drying is carried out under a reduced pressure preferably at 0° C. or higher for 0.5 to 24 hours; more preferably at 0 to 250° C. for 0.5 to 24 hours; further preferably at 10 to 200° C. for 1 to 24 hours; particularly preferably at 10 to 160° C. for 1 to 18 hours; and most preferably at 15 to 130° C. for 1 to 18 hours.

The modified particle produced by the process of the present invention is useful (1) as a carrier, which supports a catalyst component for addition polymerization used for producing a single-site catalyst, or (2) as the catalyst component (A) for addition polymerization, particularly as a catalyst component for olefin polymerization.

In the process for producing a catalyst for addition polymerization of the present invention, (1) a catalyst for addition polymerization produced with the optional component (C) has a higher activity than that without the optional component (C), and (2) a catalyst for addition polymerization produced in combined use of an electron donor compound (D) (optional component) can produce a higher molecular weight-carrying addition polymer.

The component (B) is not particularly limited in its kind, provided that it is a transition metal compound capable of (1) forming a single-site catalyst, and (2) showing an addition-polymerization activity in combination thereof with the component (A) and the optional component (C). The "single-site catalyst" in the present invention is a catalyst distinguished from a conventional solid catalyst, and means not only a narrow sense single-site catalyst capable of producing an addition polymer having a narrow molecular weight distribution, and a high homogeneity (narrow composition distribution of an addition copolymer), but also a catalyst capable of producing an addition polymer having a broad molecular weight distribution, and a low homogeneity (broad composition distribution of an addition copolymer), provided that said catalyst is produced by a process similar to a process for producing the narrow sense single-site catalyst.

The component (B) is preferably a compound of a transition metal of Groups 3 to 11 or the lanthanide series; and more preferably a transition metal compound represented by the following formula [6], or its μ-oxo type transition metal compound dimmer:

wherein $M^3$ is a transition metal atom of Groups 3 to 11 or the lanthanide series of the periodic table; $L^2$ is a cyclopentadiene-containing anionic group or a hetero atom-containing group, and when plural $L^2$s exist, they are the same as, or different from one another, and are linked directly to one another, or through a residual group containing a carbon atom, a silicone atom, a nitrogen atom, an oxygen atom, a sulfur atom or a phosphorus atom; $X^2$ is a halogen atom, a hydrocarbon group (excluding the above-mentioned cyclopentadiene-containing anionic group) or a hydrocarbyloxy group; a is a number satisfying $0<a\leqq 8$; and b is a number satisfying $0<b\leqq 8$. When $M^3$ is a titanium atom, a zirconium atom or a hafnium atom, both a and b are preferably 2. The above-mentioned "cyclopentadiene-containing anionic group" means a group having a cyclopentadienyl type anion skeleton.

Examples of the above-mentioned $M^3$ are a scandium atom, an yttrium atom, a titanium atom, a zirconium atom, a hafnium atom, a vanadium atom, a niobium atom, a tantalum atom, a chromium atom, an iron atom, a ruthenium atom, a cobalt atom, a rhodium atom, a nickel atom, a palladium atom, a samarium atom and an ytterbium atom. Among them, preferred is a titanium atom, a zirconium atom, a hafnium atom, a vanadium atom, a chromium atom, an iron atom, a cobalt atom or a nickel atom; particularly preferred is a titanium atom, a zirconium atom or a hafnium atom; and most preferred is a zirconium atom.

Examples of the above-mentioned cyclopentadiene-containing anionic group of $L^2$ are an $\eta^5$-(substituted)cyclopentadienyl group, an $\eta^5$-(substituted)indenyl group, and an $\eta^5$-(substituted)fluorenyl group; and groups obtained by substituting one or more hydrogen atoms contained in each of the above-mentioned cyclopentadiene-containing anionic groups with any of the hydrocarbon groups exemplified as $L^1$ in the above formula [1]. Specific examples thereof are an $\eta^5$-cyclopentadienyl group, an $\eta^5$-methylcyclopentadienyl group, an $\eta^5$-ethylcyclopentadienyl group, an $\eta^5$-n-butylcyclopentadienyl group, an $\eta^5$-tert-butylcyclopentadienyl group, an $\eta^5$-1,2-dimethylcyclopentadienyl group, an $\eta^5$-1,3-dimethylcyclopentadienyl group, an $\eta^5$-1-methyl-2-ethylcyclopentadienyl group, an $\eta^5$-1-methyl-3-ethylcyclopentadienyl group, an $\eta^5$-1-tert-butyl-2-methylcyclopentadienyl group, an $\eta^5$-1-tert-butyl-3-methylcyclopentadienyl group, an $\eta^5$-1-methyl-2-isopropylcyclopentadienyl group, an $\eta^5$-1-methyl-3-isopropylcyclopentadienyl group, an $\eta^5$-1-methyl-2-n-butylcyclopentadienyl group, an $\eta^5$-1-methyl-3-n-butylcyclopentadienyl group, an $\eta^5$-1,2,3-trimethylcyclopentadienyl group, an $\eta^5$-1,2,4-trimethylcyclopentadienyl group, an $\eta^5$-tetramethylcyclopentadienyl group, an $\eta^5$-pentamethylcyclopentadienyl group, an $\eta^5$-indenyl group, an $\eta^5$-4,5,6,7-tetrahydroindenyl group, an $\eta^5$-2-methylindenyl group, an $\eta^5$-3-methylindenyl group, an $\eta^5$-4-methylindenyl group, an $\eta^5$-5-methylindenyl group, an $\eta^5$-6-methylindenyl group, an $\eta^5$-7-methylindenyl group, an $\eta^5$-2-tert-butylindenyl group, an $\eta^5$-3-tert-butylindenyl group, an $\eta^5$-4-tert-butylindenyl group, an $\eta^5$-5-tert-butylindenyl group, an $\eta^5$-6-tert-butylindenyl group, an $\eta^5$-7-tert-butylindenyl group, an $\eta^5$-2,3-dimethylindenyl group, an $\eta^5$-4,7-dimethylindenyl group, an $\eta^5$-2,4,7-trimethylindenyl group, an $\eta^5$-2-methyl-4-isopropylindenyl group, an $\eta^5$-4,5-benzindenyl group, an $\eta^5$-2-methyl-4,5-benzindenyl group, an $\eta^5$-4-phenylindenyl group, an $\eta^5$-2-methyl-5-phenylindenyl group, an $\eta^5$-2-methyl-4-phenylindenyl group, an $\eta^5$-2-methyl-4-naphthylindenyl group, an $\eta^5$-fluorenyl group, an $\eta^5$-2,7-dimethylfluorenyl group and an $\eta^5$-2,7-di-tert-butylfluorenyl group. The above term "$\eta^5$-" is omitted hereinafter.

Examples of the hetero atom in the above-mentioned hetero atom-containing group of $L^2$ are an oxygen atom, a sulfur atom, a nitrogen atom and a phosphorus atom. The hetero atom-containing group is preferably an alkoxy group; an aryloxy group; a thioalkoxy group; a thioaryloxy group; an alkylamino group; an arylamino group; an alkylphosphino group; an arylphosphino group; a chelating ligand; or an aromatic or aliphatic heterocyclic group containing, in its ring, one or more atoms selected from the group consisting of an oxygen atom, a sulfur atom, a nitrogen atom and a phosphorus atom.

Specific examples of the hetero atom-containing group are a methoxy group, an ethoxy group, a propoxy group, a butoxy group, a phenoxy group, a 2-methylphenoxy group, a 2,6-dimethylphenoxy group, a 2,4,6-trimethylphenoxy group, a 2-ethylphenoxy group, a 4-n-propylphenoxy group, a 2-isopropylphenoxy group, a 2,6-diisopropylphenoxy group, a 4-sec-butylphenoxy group, a 4-tert-butylphenoxy group, a 2,6-di-sec-butylphenoxy group, a 2-tert-butyl-4-methylphenoxy group, a 2,6-di-tert-butylphenoxy group, a 4-methoxyphenoxy group, a 2,6-dimethoxyphenoxy group, a 3,5-dimethoxyphenoxy group, a 2-chlorophenoxy group, a 4-nitrosophenoxy group, a 4-nitrophenoxy group, a 2-aminophenoxy group, a 3-aminophenoxy group, a 4-aminothiophenoxy group, a 2,3,6-trichlorophenoxy group, a 2,4,6-trifluorophenoxy group, a thiomethoxy group, a dimethylamino group, a diethylamino group, a dipropylamino group, a diphenylamino group, an isopropylamino group, a tert-butylamino group, a pyrrolyl group, a dimethylphosphino group, a 2-(2-oxy-1-propyl)phenoxy group, catechol, resorcinol, 4-isopropylcatechol, 3-methoxycatechol, a 1,8-dihydroxynahpthyl group, a 1,2-dihydroxynahpthyl group, a 2,2'-biphenyldiol group, a 1,1'-bi-2-naphthol group, a 2,2'-dihydroxy-6,6'-dimethylbiphenyl group, a 4,4',6,6'-tetra-tert-butyl-2,2'-methylenediphenoxy group, and a 4,4',6,6'-tetramethyl-2,2'-isobutylidenediphenoxy group.

Also, an example of the above-mentioned hetero atom-containing group is a group represented by the following formula [7]:

$$R^4_3P=N-\qquad [7]$$

wherein three $R^4$s are independently of one another a hydrogen atom, a halogen atom or a hydrocarbon group; they are the same as, or different from one another; and two or more thereof may be linked to one another, in which they may form a ring.

Examples of the groups of $R^4$ besides a hydrogen atom in the above formula [7] are a fluorine atom, a chlorine atom, a bromine atom, an iodine atom, a methyl group, an ethyl group, a n-propyl group, an isopropyl group, a n-butyl group, a tert-butyl group, a cyclopropyl group, a cyclobutyl group, a cycloheptyl group, a cyclohexyl group, a phenyl group, a 1-naphthyl group, a 2-naphthyl group and a benzyl group.

A further example of the above-mentioned hetero atom-containing group is a group represented by the following formula [8]:

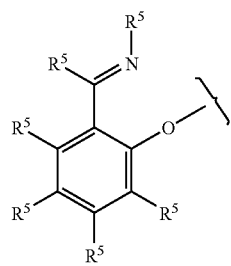

[8]

wherein six $R^5$s are independently of one another a hydrogen atom, a halogen atom, a hydrocarbon group, a halogenated hydrocarbon group, a hydrocarbyloxy group, a silyl group or an amino group; they are the same as, or different from one another; and two or more thereof may be linked to one another, in which they may form a ring.

Examples of $R^5$ besides a hydrogen atom in the above formula [8] are a fluorine atom, a chlorine atom, a bromine atom, an iodine atom, a phenyl group, a 1-naphthyl group, a 2-naphthyl group, a tert-butyl group, a 2,6-dimethylphenyl group, a 2-fluorenyl group, a 2-methylphenyl group, a 4-trifluoropmethylphenyl group, a 4-methoxyphenyl group, a 4-pyridyl group, a cyclohexyl group, a 2-isopropylphenyl group, a benzyl group, a methyl group, a triethylsilyl group, a diphenylmethylsilyl group, a 1-methyl-1-phenylethyl group, a 1,1-dimethylpropyl group, a 2-chlorophenyl group and a pentafluorophenyl group.

The "chelating ligand" of $L^2$ in the above formula [6] means a ligand having two or more coordinating positions. Examples thereof are acetylacetonate, diimine, oxazoline, bisoxazoline, terpyridine, acylhydrazone, diethylenetriamine, triethylenetetramine, porphyrin, crown ether and cryptate.

Examples of the heterocyclic group of $L^2$ in the above formula [6] are a pyridyl group, an N-substituted imidazolyl group and an N-substituted indazolyl group, and among them, preferred is a pyridyl group.

When plural $L^2$s in the above formula [6] are linked to one another through a residual group containing a carbon, silicone, nitrogen, oxygen, sulfur or phosphorus atom, namely, (1) when cyclopentadiene-containing anionic groups are linked to one another through the residual group, (2) when hetero atom-containing groups are linked to one another through the residual group, or (3) when the cyclopentadiene-containing anionic group and the hetero atom-containing group are linked to each other through the residual group, said residual group is preferably a two-valent residual group, wherein each of the two $L^2$s is linked to a carbon, silicon, nitrogen, oxygen, sulfur or phosphorus atom, and the number of atoms existing between the two $L^2$s is three or less, for example, in case of $L^2$-$C(CH_3)_2$—$C(CH_3)_2$-$L^2$, said number of atoms existing between the two $L^2$s is two.

Examples of the residual group are an alkylene group such as a methylene group, an ethylene group and a propylene group; a substituted alkylene group such as a dimethylmethylene group (an isopropylidene group) and a diphenylmethylene group; a silylene group; a substituted silylene group such as a dimethylsilylene group, a diethylsilylene group, a diphenylsilylene group, a tetramethyldisilylene group and a dimethoxysilylene group; and a hetero atom such as a nitrogen atom, an oxygen atom, a sulfur atom and a phosphorus atom. Among them, particularly preferred is a methylene group, an ethylene group, a dimethylmethylene group (an isopropylidene group), a diphenylmethylene group, a dimethylsilylene group, a diethylsilylene group, a diphenylsilylene group or a dimethoxysilylene group.

Examples of the halogen atom of $X^2$ in the above formula [6] are a fluorine atom, a chlorine atom, a bromine atom and an iodine atom. Examples of the hydrocarbon group of $X^2$ therein are an alkyl group, an aralkyl group, an aryl group and an alkenyl group. Among them, preferred is an alkyl group having 1 to 20 carbon atoms, an aralkyl group having 7 to 20 carbon atoms, an aryl group having 6 to 20 carbon atoms, or an alkenyl group having 3 to 20 carbon atoms.

Examples of said alkyl group having 1 to 20 carbon atoms are a methyl group, an ethyl group, a n-propyl group, an isopropyl group, a n-butyl group, a sec-butyl group, a tert-butyl group, an isobutyl group, a n-pentyl group, a neopentyl group, an amyl group, a n-hexyl group, a n-octyl group, a n-decyl group, a n-dodecyl group, a n-pentadecyl group and a n-eicosyl group. Among them, preferred is a methyl group, an ethyl group, an isopropyl group, a tert-butyl group, an isobutyl group or an amyl group.

One or more hydrogen atoms contained in the above-mentioned alkyl groups may be substituted with a halogen atom such as a fluorine atom, a chlorine atom, a bromine atom and an iodine atom. Examples of the alkyl group substituted with a halogen atom are a fluoromethyl group, a trifluoromethyl group, a chloromethyl group, a trichloromethyl group, a fluoroethyl group, a pentafluoroethyl group, a perfluoropropyl group, a perfluorobutyl group, a perfluorohexyl group, a perfluorooctyl group, a perchloropropyl group, a perchlorobutyl group and a perbromopropyl group.

Also, one or more hydrogen atoms contained in the above-mentioned alkyl groups may be substituted with an alkoxy group such as a methoxy group and an ethoxy group; an aryloxy group such as a phenoxy group; or an aralkyloxy group such as a benzyloxy group.

Examples of the above-mentioned aralkyl group having 7 to 20 carbon atoms are a benzyl group, a (2-methylphenyl)methyl group, a (3-methylphenyl)methyl group, a (4-methylphenyl)methyl group, a (2,3-dimethylphenyl)methyl group, a (2,4-dimethylphenyl)methyl group, a (2,5-dimethylphenyl)methyl group, a (2,6-dimethylphenyl)methyl group, a (3,4-dimethylphenyl)methyl group, a (3,5-dimethylphenyl)methyl group, a (2,3,4-trimethylphenyl)methyl group, a (2,3,5-trimethylphenyl)methyl group, a (2,3,6-trimethylphenyl)methyl group, a (3,4,5-trimethylphenyl)methyl group, a (2,4,6-trimethylphenyl)methyl group, a (2,3,4,5-tetramethylphenyl)methyl group, a (2,3,4,6-tetramethylphenyl)methyl group, a (2,3,5,6-tetramethylphenyl)methyl group, a (pentamethylphenyl)methyl group, an (ethylphenyl)methyl group, a (n-propylphenyl)methyl group, an (isopropylphenyl)methyl group, a (n-butylphenyl)methyl group, a (sec-butylphenyl)methyl group, a (tert-butylphenyl)methyl group, a (n-pentylphenyl)methyl group, a (neopentylphenyl)methyl group, a (n-hexylphenyl)methyl group, a (n-octylphenyl)methyl group, a (n-decylphenyl)methyl group, a (n-dodecylphenyl)methyl group, a naphthylmethyl group and an anthracenylmethyl group. Among them, more preferred is a benzyl group.

One or more hydrogen atoms contained in the above-mentioned aralkyl groups may be substituted with a halogen atom such as a fluorine atom, a chlorine atom, a bromine atom and an iodine atom; an alkoxy group such as a methoxy group and an ethoxy group; an aryloxy group such as a phenoxy group; or an aralkyloxy group such as a benzyloxy group.

Examples of the above-mentioned aryl group having 6 to 20 carbon atoms are a phenyl group, a 2-tolyl group, a 3-tolyl group, a 4-tolyl group, a 2,3-xylyl group, a 2,4-xylyl group, a 2,5-xylyl group, a 2,6-xylyl group, a 3,4-xylyl group, a 3,5-xylyl group, a 2,3,4-trimethylphenyl group, a 2,3,5-trimethylphenyl group, a 2,3,6-trimethylphenyl group, a 2,4,6-trimethylphenyl group, a 3,4,5-trimethylphenyl group, a 2,3,4,5-tetramethylphenyl group, a 2,3,4,6-tetramethylphenyl group, a 2,3,5,6-tetramethylphenyl group, a pentamethylphenyl group, an ethylphenyl group, a n-propylphenyl group, an isopropylphenyl group, a n-butylphenyl group, a sec-butylphenyl group, a tert-butylphenyl group, a n-pentylphenyl group, a neopentylphenyl group, a n-hexylphenyl group, a n-octylphenyl group, a n-decylphenyl group, a n-dodecylphenyl group, a n-tetradecylphenyl group, a naphthyl group and an anthracenyl group. Among them, more preferred is a phenyl group.

One or more hydrogen atoms contained in the above-mentioned aryl groups may be substituted with a halogen atom such as a fluorine atom, a chlorine atom, a bromine atom and an iodine atom; an alkoxy group such as a methoxy group and an ethoxy group; an aryloxy group such as a phenoxy group; or an aralkyloxy group such as a benzyloxy group.

Examples of the above-mentioned alkenyl group having 3 to 20 carbon atoms are an allyl group, a methallyl group, a crotyl group and a 1,3-diphenyl-2-propenyl group. Among them, more preferred is an allyl group or a methallyl group.

Examples of the hydrocarbyloxy group of $X^2$ in the above formula [6] are an alkoxy group, an aralkyloxy group and an aryloxy group. Among the preferred is an alkoxy group having 1 to 20 carbon atoms, an aralkyloxy group having 7 to 20 carbon atoms, or an aryloxy group having 6 to 20 carbon atoms.

Examples of said alkoxy group having 1 to 20 carbon atoms are a methoxy group, an ethoxy group, a n-propoxy group, an isopropoxy group, a n-butoxy group, a sec-butoxy group, a tert-butoxy group, a n-pentoxy group, a neopentoxy group, a n-hexoxy group, a n-octoxy group, a n-dodecoxy group, a n-pentadecoxy group and a n-eicosoxy group. Among them, more preferred is a methoxy group, an ethoxy group, an isopropoxy group or a tert-butoxy group.

One or more hydrogen atoms contained in the above-mentioned alkoxy groups may be substituted with a halogen atom such as a fluorine atom, a chlorine atom, a bromine atom and an iodine atom; an alkoxy group such as a methoxy group and an ethoxy group; an aryloxy group such as a phenoxy group; or an aralkyloxy group such as a benzyloxy group.

Examples of the above-mentioned aralkyloxy group having 7 to 20 carbon atoms are a benzyloxy group, a (2-methylphenyl)methoxy group, a (3-methylphenyl)methoxy group, a (4-methylphenyl)methoxy group, a (2,3-dimethylphenyl)methoxy group, a (2,4-dimethylphenyl)methoxy group, a (2,5-dimethylphenyl)methoxy group, a (2,6-dimethylphenyl)methoxy group, a (3,4-dimethylphenyl)methoxy group, a (3,5-dimethylphenyl)methoxy group, a (2,3,4-trimethylphenyl)methoxy group, a (2,3,5-trimethylphenyl)methoxy group, a (2,3,6-trimethylphenyl)methoxy group, a (2,4,5-trimethylphenyl)methoxy group, a (2,4,6-trimethylphenyl)methoxy group, a (3,4,5-trimethylphenyl)methoxy group, a (2,3,4,5-tetramethylphenyl)methoxy group, a (2,3,4,6-tetramethylphenyl)methoxy group, a (2,3,5,6-tetramethylphenyl)methoxy group, a (pentamethylphenyl)methoxy group, an (ethylphenyl)methoxy group, a (n-propylphenyl)methoxy group, an (isopropylphenyl)methoxygroup, a (n-butylphenyl)methoxygroup, a (sec-butylphenyl)methoxy group, a (tert-butylphenyl)methoxy group, a (n-hexylphenyl)methoxy group, a (n-octylphenyl)methoxy group, a (n-decylphenyl)methoxy group, a naphthylmethoxy group and an anthracenylmethoxy group. Among them, more preferred is a benzyloxy group.

One or more hydrogen atoms contained in the above-mentioned aralkyloxy groups may be substituted with a halogen atom such as a fluorine atom, a chlorine atom, a bromine atom and an iodine atom; an alkoxy group such as a methoxy group and an ethoxy group; an aryloxy group such as a phenoxy group; or an aralkyloxy group such as a benzyloxy group.

Examples of the above-mentioned aryloxy group having 6 to 20 carbon atoms are a phenoxy group, a 2-methylphenoxy group, a 3-methylphenoxy group, a 4-methylphenoxy group, a 2,3-dimethylphenoxy group, a 2,4-dimethylphenoxy group, a 2,5-dimethylphenoxy group, a 2,6-dimethylphenoxy group, a 3,4-dimethylphenoxy group, a 3,5-dimethylphenoxy group, a 2-tert-butyl-3-methylphenoxy group, a 2-tert-butyl-4-methylphenoxy group, a 2-tert-butyl-5-methylphenoxy group, a 2-tert-butyl-6-methylphenoxy group, a 2,3,4-trimethylphenoxy group, a 2,3,5-trimethylphenoxy group, a 2,3,6-trimethylphenoxy group, a 2,4,5-trimethylphenoxy group, a 2,4,6-trimethylphenoxy group, a 2-tert-butyl-3,4-dimethylphenoxy group, a 2-tert-butyl-3,5-dimethylphenoxy group, a 2-tert-butyl-3,6-dimethylphenoxy group, a 2,6-di-tert-butyl-3-methylphenoxy group, a 2-tert-butyl-4,5-dimethylphenoxy group, a 2,6-di-tert-butyl-4-methylphenoxy group, a 3,4,5-trimethylphenoxy group, a 2,3,4,5-tetramethylphenoxy group, a 2-tert-butyl-3,4,5-trimethylphenoxy group, a 2,3,4,6-tetramethylphenoxy group, a 2-tert-butyl-3,4,6-trimethylphenoxy group, a 2,6-di-tert-butyl-3,4-dimethylphenoxy group, a 2,3,5,6-tetramethylphenoxy group, a 2-tert-butyl-3,5,6-trimethylphenoxy group, a 2,6-di-tert-butyl-3,5-dimethylphenoxy group, a pentamethylphenoxy group, an ethylphenoxy group, a n-propylphenoxy group, an isopropylphenoxy group, a n-butylphenoxy group, a sec-butylphenoxy group, a tert-butylphenoxy group, a n-hexylphenoxy group, a n-octylphenoxy group, a n-decylphenoxy group, a n-tetradecylphenoxy group, a naphthoxy group and an anthracenoxy group.

One or more hydrogen atoms contained in the above-mentioned aryloxy groups may be substituted with a halogen atom such as a fluorine atom, a chlorine atom, a bromine atom and an iodine atom; an alkoxy group such as a methoxy group and an ethoxy group; an aryloxy group such as a phenoxy group; or an aralkyloxy group such as a benzyloxy group.

$X^2$ in the above formula [6] is more preferably a chlorine atom, a methyl group, an ethyl group, a n-propyl group, an isopropyl group, a n-butyl group, a methoxy group, an ethoxy group, a n-propoxy group, an isopropoxy group, a n-butoxy group, a trifluoromethoxy group, a phenyl group, a phenoxy group, a 2,6-di-tert-butylphenoxygroup, a 3,4,5-trifluorophenoxygroup, a pentafluorophenoxy group, a 2,3,5,6-tetrafluoro-4-pentafluorophenylphenoxy group or a benzyl group.

Examples of the transition metal compound represented by the above formula [6], wherein the transition metal atom is a titanium atom, a zirconium atom or a hafnium atom, are bis(cyclopentadienyl)titanium dichloride, bis(methylcyclopentadienyl)titanium dichloride, bis(ethylcyclopentadienyl) titanium dichloride, bis(n-butylcyclopentadienyl)titanium dichloride, bis(tert-butylcyclopentadienyl)titanium dichloride, bis(1,2-dimethylcyclopentadienyl)titanium dichloride, bis(1,3-dimethylcyclopentadienyl)titanium dichloride, bis (1-methyl-2-ethylcyclopentadienyl)titanium dichloride, bis (1-methyl-3-ethylcyclopentadienyl)titanium dichloride, bis (1-methyl-2-n-butylcyclopentadienyl)titanium dichloride, bis(1-methyl-3-n-butylcyclopentadienyl)titanium dichloride, bis(1-methyl-2-isopropylcyclopentadienyl)titanium dichloride, bis(1-methyl-3-isopropylcyclopentadienyl)titanium dichloride, bis(1-tert-butyl-2-methylcyclopentadienyl) titaniumdichloride, bis(1-tert-butyl-3-methylcyclopentadienyl)titaniumdichloride, bis(1,2,3-trimethylcyclopentadienyl)titanium dichloride, bis(1,2,4-trimethylcyclopentadienyl)titanium dichloride, bis (tetramethylcyclopentadienyl)titanium dichloride, bis (pentamethylcyclopentadienyl)titanium dichloride, bis (indenyl)titanium dichloride, bis(4,5,6,7-tetrahydroindenyl) titanium dichloride, bis(fluorenyl) titanium dichloride, bis(2-phenylndenyl) titanium dichloride, bis[2-(bis-3,5-trifluoromethylphenyl)indenyl]titanium dichloride, bis[2-(4-tert-butylphenyl)indenyl]titanium dichloride, bis[2-(4-trifluoromethylphenyl)indenyl]titanium dichloride, bis[2-(4-methyphenyl)indenyl]titanium dichloride, bis[2-(3,5-dimethylphenyl)indenyl]titanium dichloride, bis[2-(pentafluorophenyl)indenyl]titanium dichloride, cyclopentadienyl(pentamethylcyclopentadienyl) titanium dichloride, cyclopentadienyl(indenyl)titanium dichloride, cyclopentadienyl(fluorenyl)titanium dichloride, indenyl (fluorenyl)titanium dichloride, pentamethylcyclopentadienyl (indenyl)titanium dichloride, pentamethylcyclopentadienyl (fluorenyl)titanium dichloride, cyclopentadienyl(2-phenylindenyl)titanium dichloride, pentamethylcyclopentadienyl(2-phenylindenyl)titanium dichloride, dimethylsilylenebis(cyclopentadienyl)titanium dichloride, dimethylsilylenebis(2-methylcyclopentadienyl) titanium dichloride, dimethylsilylenebis (3-methylcyclopentadienyl) titanium dichloride, dimethylsilylenebis(2-n-butylcyclopentadienyl)titanium dichloride, dimethylsilylenebis (3-n-butylcyclopentadienyl)titanium dichloride, dimethylsilylenebis (2,3-dimethylcyclopentadienyl)titanium dichloride, dimethylsilylenebis(2,4-dimethylcyclopentadienyl)titanium dichloride, dimethylsilylenebis(2,5-dimethylcyclopentadienyl)titanium dichloride, dimethylsilylenebis (3,4-dimethylcyclopentadienyl)titanium dichloride, dimethylsilylenebis(2-ethyl-3-methylcyclopentadienyl)titanium dichloride, dimethylsilylenebis(2-ethyl-4-methylcyclopentadienyl)titanium dichloride, dimethylsilylenebis(2-ethyl-5-methylcyclopentadienyl)titanium dichloride, dimethylsilylenebis(3-ethyl-5-methylcyclopentadienyl)titanium dichloride, dimethylsilylenebis(2,3,4-trimethylcyclopentadienyl)titanium dichloride, dimethylsilylenebis(2,3,5-trimethylcyclopentadienyl)titanium dichloride, dimethylsilylenebis(tetramethylcyclopentadienyl)titanium dichloride, dimethylsilylenebis(indenyl)titanium dichloride, dimethylsilylenebis(2-methylindenyl)titanium dichloride, dimethylsilylenebis(2-tert-butylindenyl)titanium dichloride, dimethylsilylenebis(2,3-dimethylindenyl)titanium dichloride, dimethylsilylenebis(2,4,7-trimethylindenyl)titanium dichloride, dimethylsilylenebis(2-methyl-4-isopropylindenyl)titanium dichloride, dimethylsilylenebis(4,5-benzindenyl)titanium dichloride, dimethylsilylenebis(2-methyl-4,5-benzindenyl)titanium dichloride, dimethylsilylenebis(2-phenylindenyl)titanium dichloride, dimethylsilylenebis(4-phenylindenyl)titanium dichloride, dimethylsilylenebis(2-methyl-4-phenylindenyl)titanium dichloride, dimethylsilylenebis(2-methyl-5-phenylindenyl)titanium dichloride, dimethylsilylenebis(2-methyl-4-naphthylindenyl)titanium dichloride, dimethylsilylenebis(4,5,6,7-tetrahydroindenyl)titanium dichloride, dimethylsilylene(cyclopentadienyl) (indenyl)titanium dichloride, dimethylsilylene (methylcyclopentadienyl)(indenyl)titanium dichloride, dimethylsilylene(n-butylcyclopentadienyl) (indenyl)titanium dichloride, dimethylsilylene(tetramethylcyclopentadienyl) (indenyl)titanium dichloride, dimethylsilylene (cyclopentadienyl)(fluorenyl)titanium dichloride, dimethylsilylene (methylcyclopentadienyl)(fluorenyl)titanium dichloride, dimethylsilylene(n-butylcyclopentadienyl) (fluorenyl)titanium dichloride, dimethylsilylene(tetramethylcyclopentadienyl) (indenyl)titanium dichloride, dimethylsilylene(indenyl)(fluorenyl)titanium dichloride, dimethylsilylenebis (fluorenyl)titanium dichloride, dimethylsilylene (cyclopentadienyl) (tetramethylcyclopentadienyl)titanium dichloride, dimethylsilylene(tetramethylcyclopentadienyl) (fluorenyl)titanium dichloride, cyclopentadienyltitanium trichloride, pentamethylcyclopentadienyltitanium trichloride, cyclopentadienyl(dimethylamido)titanium dichloride, cyclopentadienyl(phenoxy)titanium dichloride, cyclopentadienyl(2,6-dimethylphenyl)titanium dichloride, cyclopentadienyl(2,6-diisopropylphenyl)titanium dichloride, cyclopentadienyl(2,6-di-tert-butylphenyl)titanium dichloride, pentamethylcyclopentadienyl(2,6-dimethylphenyl)titanium dichloride, pentamethylcyclopentadienyl(2,6-diisopropylphenyl)titanium dichloride, pentamethylcyclopentadienyl (2,6-tert-butylphenyl)titanium dichloride, indenyl(2,6-diisopropylphenyl)titanium dichloride, fluorenyl(2,6-diisopropylphenyl)titanium dichloride, (tert-butylamido) tetramethylcyclopentadienyl-1,2-ethanediyl-titanium dichloride, (methylamido)tetramethylcyclopentadienyl-1,2-ethanediyl-titanium dichloride, (ethylamido)tetramethylcyclopentadienyl-1,2-ethanediyl-titanium dichloride, (tert-butylamido)tetramethylcyclopentadienyldimethylsilane titanium dichloride, (benzylamido)tetramethylcyclopentadienyldimethylsilane titanium dichloride, (phenylphosphido) tetramethylcyclopentadienyldimethylsilane titanium dichloride, (tert-butylamido)indenyl-1,2-ethanediyl titanium dichloride, (tert-butylamido)tetrahydroindenyl-1,2-ethanediyl titanium dichloride, (tert-butylamido)fluorenyl-1,2-ethanediyl titanium dichloride, (tert-butylamido)indenyldimethylsilane titanium dichloride, (tert-butylamido)tetrahydroindenyldimethylsilane titanium dichloride, (tert-butylamido)fluorenyldimethylsilane titanium dichloride, (dimethylaminomethyl)tetramethylcyclopentadienyl titanium(III) dichloride, (dimethylaminoethyl)tetramethylcyclopentadienyl titanium(III) dichloride, (dimethylaminopropyl)tetramethylcyclopentadienyl titanium(III) dichloride, (N-pyrrolidinylethyl)tetramethylcyclopentadienyl titanium dichloride, (B-dimethylaminoborabenzene)cyclopentadienyl titanium dichloride, cyclopentadienyl(9-mesitylboraanthracenyl)titanium dichloride, 2,2'-thiobis[4-methyl-6-tert-butylphenoxy]titanium dichloride, 2,2'-thiobis[4-methyl-6-(1-methylethyl) phenoxy]titanium dichloride, 2,2'-thiobis(4,6-dimethylphenoxy)titanium dichloride, 2,2'-thiobis(4-methyl-6-tert-butylphenoxy) titanium dichloride, 2,2'-methylenebis(4-methyl-6-tert-butylphenoxy)titanium dichloride, 2,2'-ethylenebis(4-methyl-6-tert-butylphenoxy) titanium dichloride, 2,2'-sulfinylbis(4-methyl-6-tert-butylphenoxy)titanium dichloride, 2,2'-(4,4',6,6'-tetra-tert-butyl-1,1'-biphenoxy)titanium dichloride, (di-tert-butyl-1,3-propanediamido)titanium dichloride, (dicyclohexyl-1,3-propanediamido)titanium dichloride, [bis(trimethylsilyl)-1,3-propanediamido]titanium dichloride, [bis(tert-butyldimethylsilyl)-1,3-propanediamido]titanium dichloride, [bis(2,6-dimethylphenyl)-1,3-propanediamido] titanium dichloride, [bis(2,6-diisopropylphenyl)-1,3-propanediamido]titanium dichloride, [bis(2,6-di-tert-butylphenyl)-1,3-propanediamido]titanium dichloride, [bis(triisopropylsilyl)naphthalenediamido]titanium dichloride, [bis(trimethylsilyl)naphthalenediamido]titanium dichloride, [bis(tert-butyldimethylsilyl)naphthalenediamido]titanium dichloride, [hydrotris(3,5-dimethylpyrazolyl)borate]titanium trichloride, [hydrotris(3,5-diethylpyrazolyl)borate]titanium trichloride, [hydrotris(3,5-di-tert-butylpyrazolyl)borate]titanium trichloride, [tris(3,5-dimethylpyrazolyl)methyl]titanium trichloride, [tris(3,5-diethylpyrazolyl)methyl]titanium trichloride, [tris(3,5-di-tert-butylpyrazolyl)methyl]titanium trichloride, dimethylsilylene(cyclopentadienyl)(2-phenoxy)titanium dichloride, dimethylsilylene(cyclopentadienyl) (3-methyl-2-phenoxy) titanium dichloride, dimethylsilylene(cyclopentadienyl)(3,5-dimethyl-2-phenoxy)titanium dichloride, dimethylsilylene(cyclopentadienyl)(3-tert-butyl-2-phenoxy)titanium dichloride, dimethylsilylene(cyclopentadienyl)(3-tert-butyl-5-methyl-2-phenoxy)titanium dichloride, dimethylsilylene(cyclopentadienyl)(3,5-di-tert-butyl-2-phenoxy)titanium dichloride, dimethylsilylene(cyclopentadienyl)(5-methyl-3-phenyl-2-phenoxy)titanium dichloride, dimethylsilylene(cyclopentadienyl)(3-tert-butyldimethylsilyl-5-methyl-2-phenoxy)titanium dichloride, dimethylsilylene(cyclopentadienyl)(5-methyl-3-trimethylsilyl-2-phenoxy) titanium dichloride, dimethylsilylene(cyclopentadienyl)(3-tert-butyl-5-methoxy-2-phenoxy)titanium dichloride, dimethylsilylene(cyclopentadienyl)(3-tert-butyl-5-chloro-2-phenoxy)titanium dichloride, dimethylsilylene(cyclopentadienyl)(3,5-diamyl-2-phenoxy)titanium dichloride, dimethylsilylene(cyclopentadienyl)(3-phenyl-2-phenoxy)titanium dichloride and dimethylsilylene(cyclopentadienyl)(1-naphthoxy-2-yl)titanium dichloride; compounds formed by changing "titanium" contained in each of the above-mentioned compounds to "zirconium" or "hafnium"; compounds formed by changing "cyclopentadienyl" contained therein to "methylcyclopentadienyl", "n-butylcyclopentadienyl", "tert-butylcyclopentadienyl", "tetramethlycyclopentadienyl", "trimethylsilylcyclopentadienyl", "indenyl" or "fluorenyl"; compounds formed by changing "(2-phenoxy)" contained therein to "(3-phenyl-2-phenoxy)", "(3-trimethylsilyl-2-phenoxy)" or "(3-tert-butyldimethylsilyl-2-phenoxy)"; compounds formed by changing "dimethylsilylene" contained therein to "methylene", "ethylene", "dimethylmethylene(isopropylidene)", "diphenylmethylene", "diethylsilylene", "diphenylsilylene" or "dimethoxysilylene"; compounds formed by changing "dichloride" contained therein to "diethoxide", "di-n-propoxide", "diisopropoxide", "di-n-butoxide", "diisobutoxide", "di-tert-butoxide", "diphenoxide", "di(pentafluorophenoxide)" or "di(2,6-di-tert-butylphenoxide)"; and compounds formed by changing "trichloride" contained therein to "triethoxide", "tri-n-propoxide", "triisopropoxide", "tri-n-butoxide", "triisobutoxide", "tri-tert-butoxide", "triphenoxide", "tri(pentafluorophenoxide)" or "tri(2,6-di-tert-butylphenoxide)".

Examples of the transition metal compound represented by the above formula [6], wherein the transition metal atom is a nickel atom, are 2,2'-methylenebis[(4R)-4-phenyl-5,5'-dimethyloxazoline]nickel dichloride, 2,2'-methylenebis[(4R)-4-phenyl-5,5'-diethyloxazoline]nickel dichloride, 2,2'-methylenebis[(4R)-4-phenyl-5,5'-di-n-propyloxazoline]nickel dichloride, 2,2'-methylenebis[(4R)-4-phenyl-5,5'-diisopropyloxazoline]nickel dichloride, 2,2'-methylenebis[(4R)-4-phenyl-5,5'-dicyclohexyloxazoline]nickel dichloride, 2,2'-methylenebis[(4R)-4-phenyl-5,5'-dimethoxyoxazoline] nickel dichloride, 2,2'-methylenebis[(4R)-4-phenyl-5,5'-diethoxyoxazoline]nickel dichloride, 2,2'-methylenebis[(4R)-4-phenyl-5,5'-diphenyloxazoline]nickel dichloride, 2,2'-methylenebis[(4R)-4-phenyl-5,5'-di-(2-methylphenyl)oxazoline]nickel dichloride, 2,2'-methylenebis[(4R)-4-phenyl-5,5'-di-(3-methylphenyl)oxazoline]nickel dichloride, 2,2'-methylenebis[(4R)-4-phenyl-5,5'-di-(4-methylphenyl)oxazoline]nickel dichloride, 2,2'-methylenebis[(4R)-4-phenyl-5,5'-di-(2-methoxyphenyl)oxazoline]nickel dichloride, 2,2'-methylenebis[(4R)-4-phenyl-5,5'-di-(3-methoxyphenyl)oxazoline]nickel dichloride, 2,2'-methylenebis[(4R)-4-phenyl-5,5'-di-(4-methoxyphenyl)oxazoline]nickel dichloride, 2,2'-methylenebis[spiro{(4R)-4-phenyloxazoline-5,1'-cyclobutane}]nickel dichloride, 2,2'-methylenebis[spiro{(4R)-4-phenyloxazoline-5,1'-cyclopentane}]nickel dichloride, 2,2'-methylenebis[spiro{(4R)-4-phenyloxazoline-5,1'-cyclohexane}]nickel dichloride and 2,2'-methylenebis[spiro{(4R)-4-phenyloxazoline-5,1'-cycloheptane}] nickel dichloride; antipodes of the above-mentioned respective compounds; compounds formed by reversing a steric configuration of an asymmetric carbon on one oxazoline ring contained in the above-mentioned bisoxazoline compounds; compounds formed by changing "-4-phenyl" contained in the above-mentioned compounds to "-4-methyl", "-4-isopropyl", "-4-isobutyl", "-4-tert-butyl" or "-4-benzyl"; and compounds formed by changing "dichloride" contained therein to "diethoxide", "di-n-propoxide", "diisopropoxide", "di-n-butoxide", "diisobutoxide", "di-tert-butoxide", "diphenoxide", "di(pentafluorophenoxide)" or "di (2,6-di-tert-butylphenoxide)".

Further, examples of the compound represented by the above formula [6] are a nickel compound represented by the following formula; and a compound formed by changing the nickel atom contained in the following formula to a palladium atom, a cobalt atom, a rhodium atom or a ruthenium atom:

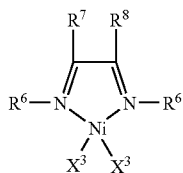

wherein $R^6$ is a 2,6-diisopropylphenyl group; each of $R^7$ and $R^8$ is independently of each other a hydrogen atom, a methyl group or an acenaphthene group formed by incorporation of $R^7$ with $R^8$; and $X^3$ is a fluorine atom, a chlorine atom, a bromine atom, an iodine atom, a methyl group, an ethyl group, a n-propyl group, an isopropyl group, a n-butyl group, a phenyl group, a benzyl group, a methoxy group, an ethoxy group, or a phenoxy group.

Examples of the transition metal compound represented by the above formula [6], wherein the transition metal atom is an iron atom, are 2,6-bis-[1-(2,6-dimethylphenylimino)ethyl]pyridineiron dichloride, 2,6-bis-[1-(2,6-diisopropylphenylimino)ethyl]pyridineiron dichloride and 2,6-bis-[1-(2-tert-butyl-phenylimino)ethyl]pyridineiron dichloride; and compounds formed by changing "dichloride" contained in each of the above-mentioned compounds to "diethoxide", "di-n-propoxide", "diisopropoxide", "di-n-butoxide", "diisobutoxide", "di-tert-butoxide", "diphenoxide", "di(pentafluorophenoxide)" or "di(2,6-di-tert-butylphenoxide)".

Examples of the component (B) other than compounds represented by the above formula [6] are [hydrotris(3,5-dimethylpyrazolyl)borate]nickel chloride, [hydrotris(3,5-diethylpyrazolyl)borate]nickel chloride and [hydrotris(3,5-di-tert-butylpyrazolyl)borate]nickel chloride; compounds formed by changing "chlorides contained in each of the above-mentioned compounds to "ethoxide", n-propoxide", "isopropoxide", "n-butoxide", "isobutoxide", "tert-butoxide", "phenoxide", "pentafluorophenoxide" or "2,6-di-tert-butylphenoxide": and compounds formed by changing "nickel" contained therein to "iron" or "cobalt".

Examples of the μ-oxo type transition metal compound of the transition metal compound represented by the above formula [6] are μ-oxobis[isopropylidene(cyclopentadienyl)(2-phenoxy)titanium chloride], μ-oxobis[isopropylidene(cyclopentadienyl) (3-tert-butyl-5-methyl-2-phenoxy)titanium chloride], μ-oxobis[isopropylidene(methylcyclopentadienyl) (2-phenoxy)titanium chloride], μ-oxobis[isopropylidene (methylcyclopentadienyl)(3-tert-butyl-5-methyl-2-phenoxy)titanium chloride], μ-oxobis[isopropylidene (tetramethylcyclopentadienyl) (2-phenoxy)titanium chloride], μ-oxobis[isopropylidene (tetramethylcyclopentadienyl)(3-tert-butyl-5-methyl-2-phenoxy)titanium chloride], μ-oxobis[dimethylsilylene(cyclopentadienyl) (2-phenoxy)titanium chloride], μ-oxobis[dimethylsilylene (cyclopentadienyl)(3-tert-butyl-5-methyl-2-phenoxy)titanium chloride], μ-oxobis[dimethylsilylene (methylcyclopentadienyl)(2-phenoxy)titanium chloride], μ-oxobis[dimethylsilylene(methylcyclopentadienyl) (3-tert-butyl-5-methyl-2-phenoxy)titanium chloride], μ-oxobis[dimethylsilylene (tetramethylcyclopentadienyl) (2-phenoxy)titanium chloride] and μ-oxobis[dimethylsilylene (tetramethylcyclopentadienyl)(3-tert-butyl-5-methyl-2-phenoxy)titanium chloride]; and compounds formed by changing "chloride" contained in each of the above-mentioned compounds to "ethoxide", "n-propoxide", "isopropoxide", "n-butoxide", "isobutoxide", "tert-butoxide", "phenoxide", "pentafluorophenoxide" or "2,6-di-tert-butylphenoxide".

The above-mentioned transition metal compounds are used singly, or in combination of two or more thereof.

Among the above-exemplified component (B), preferred is the component (B) represented by the above formula [6]. Among them, preferred is the component (B) containing an atom of Group 4 as $M^3$ in the formula [6]; further preferred is the component (B) containing a cyclopentadiene-containing anionic group as at least one $L^2$ in the formula [6]; and particularly preferred is the component (B), wherein plural $L^2$s are linked to one another through a residual group containing a carbon, silicon, nitrogen, oxygen, sulfur or phosphorus atom.

The component (C) may be an organoaluminum compound known in the art, and preferred is an organoaluminum compound represented by the following formula [9]:

$$R^9{}_cAlY_{3-c} \qquad [9]$$

wherein $R^9$ is a hydrocarbon group, and when plural $R^9$s exist, they are the same as, or different from one another; Y is a hydrogen atom, a halogen atom, an alkoxy group, an aralkyloxy group or an aryloxy group, and when plural Ys exist, they are the same as, or different from one another; and c is a number satisfying $0<c\leqq 3$.

$R^9$ in the above formula [9] is preferably a hydrocarbon group having 1 to 24 carbon atoms, and more preferably an alkyl group having 1 to 24 carbon atoms. Examples of $R^9$ are a methyl group, an ethyl group, a n-propyl group, a n-butyl group, an isobutyl group, a n-hexyl group, a 2-methylhexyl group and a n-octyl group. Among them, preferred is an ethyl group, a n-butyl group, an isobutyl group, a n-hexyl group, or a n-octyl group.

Examples of the halogen atom of Y in the above formula [9] are a fluorine atom, a chlorine atom, a bromine atom and an iodine atom, and preferred is a chlorine atom.

The alkoxy group of Y in the above formula [9] is preferably an alkoxy group having 1 to 24 carbon atoms. Examples thereof are a methoxy group, an ethoxy group, a n-propoxy group, an isopropoxy group, a n-butoxy group, a sec-butoxy group, a tert-butoxy group, a n-pentoxy group, a neopentoxy group, a n-hexoxy group, a n-octoxy group, a n-dodecoxy group, a n-pentadecoxy group and a n-eicoxy group. Among them, preferred is a methoxy group, an ethoxy group, or a tert-butoxy group.

The aralkyloxy group of Y in the above formula [9] is preferably an aralkyloxy group having 7 to 24 carbon atoms. Examples thereof are a benzyloxy group, a (2-methylphenyl)methoxy group, a (3-methylphenyl)methoxy group, a (4-methylphenyl)methoxy group, a (2,3-dimethylphenyl)methoxy group, a (2,4-dimethylphenyl)methoxy group, a (2,5-dimethylphenyl)methoxy group, a (2,6-dimethylphenyl)methoxy group, a (3,4-dimethylphenyl)methoxy group, a (3,5-dimethylphenyl)methoxy group, a (2,3,4-trimethylphenyl)methoxy group, a (2,3,5-trimethylphenyl)methoxy group, a (2,3,6-trimethylphenyl)methoxy group, a (2,4,5-trimethylphenyl)methoxy group, a (2,4,6-trimethylphenyl)methoxy group, a (3,4,5-trimethylphenyl)methoxy group, a (2,3,4,5-tetramethylphenyl)methoxy group, a (2,3,5,6-tetramethylphenyl)methoxy group, a (pentamethylphenyl)methoxy group, an (ethylphenyl)methoxy group, a (n-propylphenyl)methoxy group, an (isopropylphenyl)methoxy group, a (n-butylphenyl)methoxy group, a (sec-butylphenyl)methoxy group, a (tert-butylphenyl)methoxy group, a (n-hexylphenyl)methoxy group, a (n-octylphenyl)methoxy group, a (n-decylphenyl) methoxy group, a (n-tetradecylphenyl)methoxy group, a naphthylmethoxy group and an anthracenylmethoxy group.

Among them, preferred is a benzyloxy group.

The aryloxy group of Y in the above formula [9] is preferably an aryloxy group having 6 to 24 carbon atoms. Examples thereof are a phenoxy group, a 2-methylphenoxy group, a 3-methylphenoxy group, a 4-methylphenoxy group, a 2,3-dimethylphenoxy group, a 2,4-dimethylphenoxy group, a 2,5-dimethylphenoxy group, a 2,6-dimethylphenoxy group, a 3,4-dimethylphenoxy group, a 3,5-dimethylphenoxy group, a 2,3,4-trimethylphenoxy group, a 2,3,5-trimethylphenoxy group, a 2,3,6-trimethylphenoxy group, a 2,4,5-trimethylphenoxy group, a 2,4,6-trimethylphenoxy group, a 3,4,5-trimethylphenoxy group, a 2,3,4,5-tetramethylphenoxy group, a 2,3,4,6-tetramethylphenoxy group, a 2,3,5,6-tetramethylphenoxy group, a pentamethylphenoxy group, an ethylphenoxy group, a n-propylphenoxy group, an isopropylphenoxy group, a n-butylphenoxy group, a sec-butylphenoxy group, a tert-butylphenoxy group, a n-hexylphenoxy group, a n-octylphenoxy group, a n-decylphenoxy group, a n-tetradecylphenoxy group, a naphtoxy group and an anthracenoxy group.

Examples of the organoaluminum compound represented by the above formula [9] are a trialkylaluminum such as trimethylaluminum, triethylaluminum, tri-n-propylaluminum, tri-n-butylaluminum, triisobutylaluminum, tri-n-hexylaluminum and tri-n-octylaluminum; a dialkylaluminum chloride such as dimethylaluminum chloride, diethylaluminum chloride, di-n-propylaluminum chloride, di-n-butylaluminum chloride, diisobutylaluminum chloride and di-n-hexylaluminum chloride; an alkylaluminum dichloride such as methylaluminum dichloride, ethylaluminum dichloride, n-propylaluminum dichloride, n-butylaluminum dichloride, isobutylaluminum dichloride and n-hexylaluminum dichloride; a dialkylaluminum hydride such as dimethylaluminum hydride, diethylaluminum hydride, di-n-propylaluminum hydride, di-n-butylaluminum hydride, diisobutylaluminum hydride and di-n-hexylaluminum hydride; an alkyl(dialkoxy)aluminum such as methy(dimethoxy)aluminum, methyl(diethoxy) aluminum and methyl(di-tert-butoxy)aluminum; a dialkyl(alkoxy)aluminum such as dimethy(methoxy)aluminum, dimethyl(ethoxy)aluminum and dimethyl(tert-butoxy) aluminum; an alkyl(diaryloxy)aluminum such as methyl (diphenoxy)aluminum, methylbis(2,6-diisopropylphenoxy) aluminum and methylbis(2,6-diphenylphenoxy)aluminum; and a dialkyl(aryloxy)aluminum such as dimethyl(phenoxy) aluminum, dimethyl(2,6-diisopropylphenoxy)aluminum and dimethyl(2,6-diphenylphenoxy)aluminum.

Among them, preferred is a trialkylaluminum; further preferred is trimethylaluminum, triethylaluminum, tri-n-butylaluminum, triisobutylaluminum, tri-n-hexylaluminum or tri-n-octylaluminum; and particularly preferred is triisobutylaluminum or tri-n-octylaluminum.

The above-mentioned organoaluminum compounds are used singly, or in combination of two or more thereof.

Examples of the above-mentioned electron donor compound (D), which is hereinafter referred to as "component (D)", are an oxygen-containing compound, a nitrogen-containing compound, a phosphor-containing compound and a sulfur-containing compound. Among them, preferred is an oxygen-containing compound or a nitrogen-containing compound.

Examples of the oxygen-containing compound are an alkoxysilicon, an ether, a ketone, an aldehyde, a carboxylic acid, an ester of an organic acid, an ester of an inorganic acid, an amide of an organic acid, an amide of an inorganic acid and an acid anhydride. Among them, preferred is an alkoxysilicon or an ether.

Examples of the above-mentioned nitrogen-containing compound are an amine, a nitrile and an isocyanate, and among them, preferred is an amine.

The above-mentioned alkoxysilicon is preferably a compound represented by the following formula:

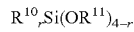

$$R^{10}{}_r Si(OR^{11})_{4-r}$$

wherein $R^{10}$ is a hydrocarbon group having 1 to 20 carbon atoms, a hydrogen atom, or a group having a hetero atom such as an oxygen atom, a nitrogen atom, a sulfur atom and a phosphor atom, and when plural $R^{10}$s exist, they are the same as, or different from one another; $R^{11}$ is a hydrocarbon group having 1 to 20 carbon atoms, and when plural $R^{11}$s exist, they are the same as, or different from one another; and r is a number satisfying $0 \leq r < 4$.

Examples of the hydrocarbon group of $R^{10}$ and $R^{11}$ in the above formula are a linear alkyl group such as a methyl group, an ethyl group, a propyl group, a butyl group, a pentyl group and a n-hexyl group; a branched-chain alkyl group such as an isopropyl group, a sec-butyl group, a tert-butyl group and a tert-amyl group; a cycloalkyl group such as a cyclopentyl group and a cyclohexyl group; a cycloalkenyl group such as a cyclopentenyl group; and an aryl group such as a pheny group and a tolyl group.

Examples of the group having a hetero atom of $R^{10}$ in the above formula are a dimethylamino group, a methylethyl amino group, a diethylamino group, an ethyl-n-propylamino group, a di-n-propylamino group, a pyrrolyl group, a pyridyl group, a pyrrolidinyl group, a piperidyl group, a perhydroindolyl group, a perhydroisoindolyl group, a perhydroquinolyl group, a perhydroisoquinolyl group, a perhydrocarbazolyl group, a perhydroacridinyl group, a furyl group, a pyranyl group, a perhydrofuryl group and a thienyl group.

Among the above-mentioned alkoxysilicon, preferred is an alkoxysilicon having $R^{10}$ and $R^{11}$ of an alkyl group; and more preferred is an alkoxysilicon having r satisfying $2 \leq r < 4$.

Examples of the above-mentioned alkoxysilicon are tetramethoxysilane, methyltrimethoxysilane, ethyltrimethoxysilane, n-propyltrimethoxysilane, isopropyltrimethoxysilane, n-butyltrimethoxysilane, isobutyltrimethoxysilane, sec-butyltrimethoxysilane, tert-butyltrimethoxysilane, n-pentyltrimethoxysilane, n-hexyltrimethoxysilane, tert-amyltrimethoxysilane, dimethyldimethoxysilane, diethyldimethoxysilane, di-n-butyldimethoxysilane, diisobutyldimethoxysilane, di-tert-butyldimethoxysilane, methylethydimethoxysilane, methyl-n-propyldimethoxysilane, methyl-n-butyldimethoxysilane, methylisobutyldimethoxysilane, tert-butylmethyldimethoxysilane, tert-butylethyldimethoxysilane, tert-butyl-n-propyldimethoxysilane, tert-butylisopropyldimethoxysilane, tert-butyl-n-butyldimethoxysilane, tert-butylisobutyldimethoxysilane, tert-amylmethyldimethoxysilane, tert-amylethyldimethoxysilane, tert-amyl-n-propyldimethoxysilane, tert-amyl-n-butyldimethoxysilane, isobutylisopropyldimethoxysilane, dicyclobutyldimethoxysilane, cyclobutylmethyldimethoxysilane, cyclobutylethyldimethoxysilane, cyclobutylisopropyldimethoxysilane, cyclobutyl-n-butyldimethoxysilane, cyclobutylisobutyldimethoxysilane, cyclobutyl-tert-butyldimethoxysilane, dicyclopentyldimethoxysilane, cyclopentylmethyldimethoxysilane, cyclopentyl-n-propyldimethoxysilane, cyclopentylisopropyldimethoxysilane, cyclopentyl-n-butyldimethoxysilane, cyclopentylisobutyldimethoxysilane, cyclopentyl-tert-butyldimethoxysilane, dicyclohexyldimethoxysilane, cyclohexylmethyldimethoxysilane, cyclohexylethyldimethoxysilane, cyclohexyl-n-propyldimethoxysilane, cyclohexylisopropyldimethoxysilane, cyclohexyl-n-butyldimethoxysilane, cyclohexylisobutyldimethoxysilane, cyclohexyl-tert-butyldimethoxysilane, cyclohexylcyclopentyldimethoxysilane, cyclohexylphenyldimethoxysilane, diphenyldimethoxysilane, phenylmethyldimethoxysilane, phenylethyldimethoxysilane, phenyl-n-propyldimethoxysilane, phenylisopropyldimethoxysilane, phenyl-n-butyldimethoxysilane, phenylisobutyldimethoxysilane, phenyl-tert-butyldimethoxysilane, phenylcyclopentyldimethoxysilane, 2-norbornanemethyldimethoxysilane, bis(perhydroquinolino)dimethoxysilane, bis(perhydroisoquinolino)dimethoxysilane, (perhydroquinolino)(perhydroisoquinolino)dimethoxysilane, (perhydroquinolino)methyldimethoxysilane, (perhydroisoquinolino)methyldimethoxysilane, (perhydroquinolino)ethyldimethoxysilane, (perhydroisoquinolino)ethyldimethoxysilane, (perhydroquinolino)(n-propyl)dimethoxysilane, (perhydroisoquinolino)(n-propyl)dimethoxysilane, (perhydroquinolino)(tert-butyl)dimethoxysilane, (perhydroisoquinolino)(tert-butyl)dimethoxysilane, trimethylmethoxysilane, triethylmethoxysilane, tri-n-propylmethoxysilane, triisopropylmethoxysilane, tri-n-butylmethoxysilane, triisobutylmethoxysilane and tri-tert-butylmethoxysilane; and compounds formed by changing "methoxy" contained in the above-mentioned compounds to "ethoxy", "propoxy", "n-butoxy", "isobutoxy", "tert-butoxy" or "phenoxy" Among them, preferred is a dialkyldialkoxysilane or a trialkylmonoalkoxysilane; and more preferred is a trialkylmonoalkoxysilane.

Examples of the above-mentioned ether are a dialkyl ether, an alkyl aryl ether, a diaryl ether, a diether, a cyclic ether and a cyclic diether. Specific examples thereof are dimethyl ether, diethyl ether, di-n-propyl ether, diisopropyl ether, di-n-butyl ether, diisobutyl ether, di-tert-butyl ether, dicyclohexyl ether, diphenyl ether, methyl ethyl ether, methyl n-propyl ether, methyl isopropyl ether, methyl n-butyl ether, methyl isobutyl ether, methyl tert-butyl ether, methyl cyclohexyl ether, methyl phenyl ether, ethylene oxide, propylene oxide, oxetane (trimethylene oxide), tetrahydrofuran, 2,5-dimethyltetrahydrofuran, tetrahydropyrane, 1,2-dimethoxyethane, 1,2-diethoxyethane, 1,2-diisobutoxyethane, 2,2-dimethoxypropane, 1,3-dimethoxypropane, 2,2-diisobutyl-1,3-dimethoxypropane, 2-isopropyl-2-isopentyl-1,3-dimethoxypropane, 2,2-bis(cyclohexylmethyl)-1,3-dimethoxypropane, 2-isopropyl-2-3,7-dimethyloctyl-1,3-dimethoxypropane, 2,2-diisopropyl-1,3-dimethoxypropane, 2-isopropyl-2-cyclohexylmethyl-1,3-dimethoxypropane, 2,2-dicyclohexyl-1,3-dimethoxypropane, 2-isopropyl-2-isobutyl-1,3-dimethoxypropane, 2,2-diisopropyl-1,3-dimethoxypropane, 2,2-dipropyl-1,3-dimethoxypropane, 2-isopropyl-2-cyclohexyl-1,3-dimethoxypropane, 2-isopropyl-2-cyclopentyl-1,3-dimethoxypropane, 2,2-dicyclopentyl-1,3-dimethoxypropane, 2-heptyl-2-pentyl-1,3-dimethoxypropane, 1,2-dimethoxybenzene, 1,3-dimethoxybenzene, 1,4-dimethoxybenzene, 1,3-dioxolan, 1,4-dioxane and 1,3-dioxane. Among them, preferred is diethyl ether, di-n-butyl ether, methyl n-butyl ether, methyl tert-butyl ether, methyl phenyl ether, tetrahydrofuran, 1,3-dioxane, 1,4-dioxane or 1,3-dioxolan; and further preferred is diethyl ether, di-n-butyl ether or tetrahydrofuran.

Examples of the above-mentioned ester of an organic acid are an ester of a mono carboxylic acid, and an ester of a poly-carboxylic acid. More specific examples thereof are an ester of a saturated aliphatic carboxylic acid, an ester of an unsaturated aliphatic carboxylic acid, an ester of an alicyclic carboxylic acid, and an ester of an aromatic carboxylic acid.

Further specific examples thereof are methyl acetate, ethyl acetate, n-butyl acetate, isobutyl acetate, tert-butyl acetate, phenyl acetate, methyl propionate, ethyl propionate, ethyl butyrate, ethyl valerate, ethyl acrylate, methyl methacrylate, methyl benzoate, ethyl benzoate, n-butyl benzoate, isobutyl benzoate, tert-butyl benzoate, methyl toluate, ethyl toluate, methyl anisate, ethyl anisate, dimethyl succinate, diethyl succinate, di-n-butyl succinate, dimethyl malonate, diethyl malonate, di-n-butyl malonate, dimethyl maleate, dibutyl maleate, diethyl itaconate, di-n-butyl itaconate, monoethyl phthalate, dimethyl phthalate, methyl ethyl phthalate, diethyl phthalate, di-n-propyl phthalate, diisopropyl phthalate, di-n-butyl phthalate, diisobutyl phthalate, di-tert-butyl phthalate, dipentyl phthalate, di-n-hexyl phthalate, diheptyl phthalate, di-n-octyl phthalate, di(2-ethylhexyl)phthalate, diisodecyl phthalate, dicyclohexyl phthalate, diphenyl phthalate, dimethyl isophthalate, diethyl isophthalate, di-n-butyl isophthalate, diisobutyl isophthalate, di-tert-butyl isophthalate, dimethyl terephthalate, diethyl terephthalate, di-n-butyl terephthalate, diisobutyl terephthalate and di-tert-butyl terephthalate. Among them, preferred is methyl acetate, ethyl acetate, methyl benzoate, ethyl benzoate, dimethyl phthalate, diethyl phthalate, di-n-butyl phthalate, diisobutyl phthalate, dimethyl terephthalate, diethyl terephthalate; and more preferred is methyl benzoate, dimethyl phthalate, diethyl phthalate, diisobutyl phthalate or dimethyl terephthalate.

Examples of the above-mentioned amine are a trihydrocarbylamine, ammonia, a primary amine, a secondary amine, aniline and its derivatives, an imine, an amide, pyrrole and its derivatives, pyrrolidine and its derivatives, piperidine and its derivatives, and hydroxylamine. Among them, preferred is trihydrocarbylamine, a primary amine, a secondary amine, aniline and its derivatives, pyrrolidine and its derivatives, or piperidine and its derivatives; and particularly preferred is trihydrocarbylamine, a primary amine, a secondary amine, or aniline and its derivatives.

Examples of the above-mentioned trihydrocarbylamine are trimethylamine, triethylamine, tri-n-propylamine, triisopropylamine, tri-n-butylamine, triisobutylamine, tri-n-hexylamine, tri-n-octylamine, triisooctylamine, tridodecylamine, triphenylamine, ethyldimethylamine, n-propyldimethylamine, isopropyldimethylamine, n-butyldimethylamine, isobutyldimethylamine, n-dodecyldimethylamine, methyldiethylamine, n-propyldiethylamine, isopropyldiethylamine, n-butyldiethylamine, isobutyldiethylamine, methyldi-n-propylamine, ethyldi-n-propylamine, ethyldiisopropylamine, isopropyldi-n-propylamine, n-butyldi-n-propylamine, isobutyldi-n-propylamine, methyldiisopropylamine, ethyldiisopropylamine, n-propyldiisopropylamine, n-butyldiisopropylamine, and isobutyldiisopropylamine. Among them, preferred is triethylamine or trioctylamine.

Examples of the above-mentioned primary amine are methylamine, ethylamine, n-propylamine, isopropylamine, n-butylamine, isobutylamine, tert-butylamine, hexylamine, octylamine and dodecylamine.

Examples of the above-mentioned secondary amine are dimethylamine, diethylamine, di-n-propylamine, diisopropylamine, di-n-butylamine, diisobutylamine, di-tert-butylamine, dihexylamine, dioctylamine, didodecylamine, diphenylamine and ethylmethylamine.

Examples of the above-mentioned aniline and its derivatives are aniline, N-methylaniline, N,N-dimethylaniline, N-ethylaniline, N,N-diethylaniline, 4-methylaniline and 2,6-dimethylaniline.

Examples of the above-mentioned pyrrolidine and its derivatives are pyrrolidine, 2,5-dimethylpyrrolidine and 2,2,5,5-tetramethylpyrrolidine.

Examples of the above-mentioned piperidine and its derivatives are piperidine, 4-methylpiperidine, 2,6-dimethylpiperidine and 2,2,6,6-tetramethylpiperidine.

Among the above-exemplified compounds, further preferred is triethylamine, tri-n-propylamine, tri-n-butylamine, tri-n-octylamine, methylamine, ethylamine, dimethylamine, diethylamine, aniline, N-methylaniline, 2,5-dimethylpyrrolidine or 2,6-dimethylpiperidine; and particularly preferred is triethylamine, tri-n-octylamine, ethylamine, diethylamine or N-methylaniline.

The component (D) is preferably an alkoxysilicon, an ether or an amine; and particularly preferred is an ether or an amine.

The component (B) is used in amount of usually $1 \times 10^{-6}$ to $1 \times 10^{-3}$ mol, and preferably $5 \times 10^{-6}$ to $5 \times 10^{-4}$ mol per 1 g of the component (A) used. The component (C) is used in an amount of preferably 0.01 to 10,000 gram atom, more preferably 0.1 to 5,000 gram atom, and most preferably 1 to 2,000 gram atom in terms of an amount of an aluminum atom contained in the component (C), per 1 gram atom of a transition metal contained in the component (B) used.

The component (D) is used in amount of usually 0.01 to 1,000 mmol, preferably 0.05 to 100 mmol, and more preferably 0.1 to 50 mmol per 1 g of the component (A) used.

Examples of a method for contacting the component (A), the component (B) and the optional components (C) and/or (D) in the process for producing a catalyst for addition polymerization of the present invention are (1) a method comprising the steps of (i) contacting all those components in any order in a reactor for producing a catalyst to form a catalyst, and then, (ii) feeding the catalyst to a polymerization reactor; (2) a method comprising the step of feeding those components separately to a polymerization reactor to form a catalyst therein; and (3) a method comprising the steps of (i) contacting any components of those components to form a contact product, and then, (ii) feeding the contact product and the remaining component(s) separately to a polymerization reactor to form a catalyst therein.

In the present invention, preferred is a method comprising the steps of (i) contacting the component (A) with the component (B) to form a contact product, and then, (ii) feeding the contact product and the remaining component(s) separately to a polymerization reactor to form a catalyst therein, in order to produce an addition polymer having a higher molecular weight, wherein the above step (i) preferably comprises the sub-steps of (i-i) contacting the component (B) with the optional component (C) to produce a first sub-cpontact product, and then, (i-ii) contacting the first sub-contact product with the component (A) to form a second sub-contact product. The above-menitoned contact product formed in the above step (i), first sub-cpontact product formed in the above sub-step (i-i), or second sub-cpontact product formed in the above sub-step (i-ii) is usually washed with a solvent.

Each of the components (A), (B), (C) and (D) is used (1) in a solid state, (2) in a solution obtained by dissolving it in a hydrocarbon solvent sufficiently free from a compound (for example, moisture and oxygen), which deactivates those components, or (3) in a suspension obtained by suspending it in said hydrocarbon solvent. Examples of said solvent are an aliphatic hydrocarbon solvent such as butane, pentane, hexane, heptane and octane; an aromatic hydrocarbon solvent such as benzene and toluene; and a halogenated hydrocarbon solvent such as dichloromethane. Among them, preferred is an aliphatic hydrocarbon or an aromatic hydrocarbon.

A concentration of the component (A) in each of the above-mentioned solution and suspension is usually 0.01 to 1,000 g/liter, and preferably 0.1 to 500 g/liter; a concentration of the component (B) therein is usually 0.0001 to 1,000 milligram atom/liter, and preferably 0.01 to 50 milligram atom/liter, in terms of a concentration of a transition metal atom contained in the component (B) used; a concentration of the component (C) therein is usually 0.0001 to 100 gram atom/liter, and preferably 0.01 to 10 gram atom/liter, in terms of a concentration of an aluminum atom contained in the component (C) used; and a concentration of the component (D) therein is usually 0.00001 to 10 mol/liter, and preferably 0.001 to 1 mol/liter.

A method for addition-polymerizing in the process for producing an addition polymer of the present invention is not limited. Examples thereof are (1) a gas-phase polymerization method, wherein a gaseous addition-polymerizable monomer is polymerized; (2) a solution or slurry (suspension) polymerization method, wherein an addition-polymerizable monomer is polymerized in a solvent; and (3) a bulk polymerization method, wherein an addition-polymerizable monomer is used as a solvent. Examples of the solvent in the avove-mentioned method (2) are an aliphatic hydrocarbon such as butane, hexane, pentane, heptane and octane; an aromatic hydrocarbon such as benzene and toluene; and a halogenated hydrocarbon such as dichlorometane. The above-mentioned polymerization methods (1) to (3) are carried out in a batch-wise method, or in a continuous method, and may have two or more polymerization steps, whose polymerization-reaction conditions are different from one another. A polymerization time is determined according to the kind of an addition polymer produced, and a polymerization reactor, and it is usually 1 minute to 20 hours.

A catalyst produced according to the process of the present invention is used particularly suitably for polymerization, which forms an addition-polymer particle, such as a slurry polymerization, a gas-phase polymerization, and a bulk polymerization.

The above-mentioned slurry polymerization may be carried out according to a method known in the art, and under conditions known therein. Said method preferably comprises the steps of (1) feeding continuously a material such as a monomer and a diluent to a polymerization reactor, and (2) taking a produced polymer continuously or periodically out of the polymerization reactor. Examples of said polymerization reactor are (1) a loop reactor, (2) a reactor equipped with a stirrer (stirrer-carrying reactor), and (3) a reator containing plural stirrer-carrying reactors, which are different from one another in kind and/or polymerization conditions, and are linked in series, on a parallel, or in combination thereof to one another.

An example of the above-mentioned diluent is an inert diluent (medium) such as paraffin, cycloparaffin and an aromatic hydrocarbon. Said medium, and a polymerization temperature and pressure in the process for producing an addition polymer of the present invention are selected so as to produce a particulate addition polymer. Said polymerization temperature is usually about 0 to about 150° C., and preferably 30 to 100° C. Said polymerization pressure is usually about 0.1 to about 10 MPa, and preferably 0.5 to 5 MPa, under which a catalyst is held in a suspension state, and a medium and at least a part of a monomer are held in a liquid-phase.

A molecular weight of an addition polymer produced according to the process of the present invention can be regulated by a polymerization temperature, or a molecular-weight regulator such as hydrogen.

In the process for producing an addition polymer of the present invention, a catalyst component such as the component (A), the component (B), the optional component (C) and the optional component (D), and a monomer may be fed to a polymerization reactor according to any method known in the art, and in any order. Examples of a method for feeding them to a polymerization reactor are (1) a method comprising the step of feeding them at the same time, and (2) a method comprising the step of feeding them one after another. Those catalyst components may be contacted with one another in an inert atmosphere prior to a contact thereof with a monomer.

The above-mentioned gas-phase polymerization may be carried out according to a method known in the art, and under conditions known therein. A reactor for said polymerization is a fluidized-bed reactor, and preferably a fluidized bed reactor having an expanded part, which may be equipped with a stirrer.

The above-mentioned catalyst components are supplied to a polymerization reactor, separately, or after contacting any components thereof in any order, usually (1) in a state free from moisture in combination with (i) an inert gas such as nitrogen and argon, (ii) hydrogen, or (iii) ethylene, (2) in a solution state dissolved in a solvent, or (3) in a slurry state diluted with a solvent.

A polymerization temperature in the process for producing an addition polymer of the present invention is lower than a melting point of an addition polymer produced, preferably 0 to 150° C., and particularly preferably 30 to 100° C. In order to control melt flowability of an addition polymer produced, hydrogen may be added as a molecular-weight regulator. An addition-polymerizable monomer used in the present invention may be combined with an inert gas.

In polymerization of an addition-polymerizable monomer in the process for producing an addition polymer of the present invention, wherein said polymerization is referred to as "real polymerization", the component (A) of the present invention is used (1) as it is, or (2) as a pre-polymerized catalyst component produced according to the following method using the component (A).

Said pre-polymerized catalyst component is preferably produced by slurry-polymerization of a small amount of one or more kinds of olefins in the presence of the component (A), the component (B) and the optional component (C). An example of a solvent used in said slurry-polymerization is an inert hydrocarbon such as propane, butane, isobutane, pentane, isopentane, hexane, heptane, octane, cyclohexane, benzene and toluene. A partial or total amount of said inert hydrocarbon used may be replaced with a liquid olefin.

In said slurry-polymerization, the component (C) is used in an amount of usually 0.5 to 700 mol, preferably 0.8 to 500 mol, and particularly preferably 1 to 200 mol, per mol of the component (B) used.

An amount of the olefin pre-polymerized is usually 0.01 to 1000 g, preferably 0.05 to 500 g, and particularly preferably 0.1 to 200 g, per g of the component (A) used.

A concentration of the slurry in the above-mentioned slurry-polymerization is preferably 0.1 to 50 g-component (A)/liter-solvent, and particularly preferably 0.5 to 20 g-component (A)/liter-solvent. A pre-polymerization temperature is preferably −20 to 100° C., and particularly preferably 0 to 80° C. A partial pressure of the olefin contained in the gas phase in the pre-polymerization is preferably 0.001 to 2 MPa, and particularly preferably 0.01 to 1 MPa, except an olefin, which is liquid under a condition of the pre-polymerization, such as a pressure and temperature thereof. A pre-polymerization time is not particularly limited, and is, in general, suitably 2 minutes to 15 hours.

Examples of a method for supplying the components (A), (B) and (C) and an olefin to a pre-polymerization reactor are (1) a method comprising the steps of (i) supplying those components, and then (ii) supplying an olefin, (2) a method comprising the steps of (i) supplying the components (A) and (B) and an olefin, and then (ii) supplying the component (C), and (3) a method comprising the steps of (i) supplying an olefin and the components (B) and (C), and then (ii) supplying the component (A). When the component (A) is contacted with the component (C), existence of the olefin is preferable. Examples of a method for supplying an olefin to a pre-polymerization reactor are (1) a method comprising the step of supplying an olefin continuously while keeping an inner pressure of the reactor at a predetermined pressure, and (2) a method comprising the step of supplying the predetermined total amount of an olefin at the beginning. In order to control a molecular weight of a pre-polymer produced, it is possible to add a chain transfer agent such as hydrogen to a pre-polymerization reactor.

A contact product of the above-mentioned pre-polymerized catalyst component with the component (C) can also be used as a catalyst for addition polymerization in the process for producing an addition polymer of the present invention.

Examples of an addition-polymerizable monomer in the process for producing an addition polymer of the present invention are an olefin, a diolefin, a cyclic olefin, an alkenyl aromatic hydrocarbon and a polar monomer. Those monomers are used singly, or in combination of two or more thereof.

Examples of the above-mentioned addition polymerizable monomer are:

(1) an olefin such as ethylene, propylene, 1-butene, 1-pentene, 4-methyl-1-pentene, 5-methyl-1-hexene, 1-hexene, 1-heptene, 1-octene, 1-nonene, 1-decene and vinylcyclohexane;

(2) a diolefin such as 1,5-hexadiene, 1,4-hexadiene, 1,4-pentadiene, 1,7-octadiene, 1,8-nonadiene, 1,9-decadiene, 4-methyl-1,4-hexadiene, 5-methyl-1,4-hexadiene, 7-methyl-1,6-octadiene, 5-ethylidene-2-norbornene, dicyclopentadiene, 5-vinyl-2-norbornene, norbornadiene, 5-methylene-2-norbornene, 1,5-cyclooctadiene, 5,8-endomethylenehexahydronaphthalene, 1,3-butadiene, isoprene, 1,3-hexadinene, 1,3-octadiene, 1,3-cyclooctadiene and 1,3-cyclohexadiene;

(3) a cyclic olefin such as norbornene, 5-methyl-2-norbornene, 5-ethyl-2-norbornene, 5-butyl-2-norbornene, 5-phenyl-2-norbornene, 5-benzyl-2-norbornene, tetracyclododecene, tricyclodecene, tricycloundecene, pentacyclopentadecene, pentacyclohexadecene, 8-methyltetracyclododecene, 8-ethyltetracyclodecene, 5-acetyl-2-norbornene, 5-acetyloxy-2-norbornene, 5-methoxycarbonyl-2-norbornene, 5-ethoxycarbonyl-2-norbornene, 5-methyl-5-methoxycarbonyl-2-norbornene, 5-cyano-2-norbornene, 8-methoxycarbonyltetracyclododecene, 8-methyl-8-tetracyclododecene and 8-cyanotetracyclododecene;

(4) an alkenyl aromatic hydrocarbon such as styrene, an alkenylbenzene (for example, 2-phenylpropylene, 2-phenylbutene and 3-phenylpropylene), an alkylstyrene (for example, p-methylstyrene, m-methylstyrene, o-methylstyrene, p-ethylstyrene, m-ethylstyrene, o-ethylstyrene, α-methylstyrene, 2,4-dimethylstyrene, 2,5-dimethylstyrene, 3,4-dimethylstyrene, 3,5-dimethylstyrene, 3-methyl-5-ethylstyrene, 1,1-diphenylethylene, p-tert-butylstyrene and p-sec-butylstyrene), a bisalkenylbenzene (for example, divinylbenzene), and an alkenylnaphthalene (for example, 1-vinylnaphthalene); and (5) a polar monomer such as an α,β-unsaturated carboxylic acid (for example, acrylic acid, methacrylic acid, fumaric acid, maleic anhydride, itaconic acid, itaconic anhydride and bicyclo(2,2,1)-5-heptene-2,3-dicarboxylic acid); a salt of the above-mentioned α,β-unsaturated carboxylic acid with a metal such as sodium, potassium, lithium, zinc, magnesium and calcium; an α,β-unsaturated carboxylic acid ester (for example, methyl acrylate, ethyl acrylate, n-propyl acrylate, isopropyl acrylate, tert-butyl acrylate, 2-ethylhexyl acrylate, methyl methacrylate, ethyl methacrylate, n-propyl methacrylate, isopropyl methacrylate, n-butyl methacrylate and isobutyl methacrylate); an unsaturated dicarboxylic acid (for example, maleic acid and itaconic acid); a vinyl ester (for example, vinyl acetate, vinyl propionate, vinyl caproate, vinyl caprate, vinyl laurate, vinyl stearate and vinyl trifluoroacetate); and an unsaturated carboxylic acid glycidyl ester (for example, glycidyl acrylate, glycidyl methacrylate and monoglycidyl itaconate).

An addition polymer produced according to the process of the present invention is a homopolymer or a copolymer. Examples of a combination of monomers in said copolymer are ethylene-propylene, ethylene-1-butene, ethylene-1-hexene, ethylene-1-octene, propylene-1-butene, ethylene-propylene-butene and ethylene-propylene-1-hexene.

The catalyst for addition polymerization produced according to the process of the present invention is suitably used for producing an olefin polymer. An example of said olefin polymer is particularly preferably an ethylene-α-olefin copolymer, and among them, preferred is an ethylene-α-olefin copolymer having a polyethylene-crystalline structure, wherein the α-olefin has preferably 3 to 8 carbon atoms such as 1-butene, 1-hexene and 1-octene.

EXAMPLE

The present invention is explained in more detail with reference to the following Examples, but the present invention is not limited thereto.

Example 1

(1) Pretreatment of Silica

Silica manufactured by Davison Co., Ltd., which has a tradename of SYLOPOL 948, a lot number of SMR49-3266, an average particle diameter of 60 μm, a pore volume of 1.70 ml/g, and a specific surface area of 292 m$^2$/g, was heated at 300° C. in a stream of nitrogen, thereby obtaining a heat-treated silica. Into a four-necked 3-liter flask, 106 g of the heat-treated silica was put, wherein air contained in the flask had been replaced with nitrogen. Next, 1.0 liter of toluene was added thereto under washing down the heat-treated silica adhering to a wall of the flask.

The resultant mixture was cooled to 5° C., and then, a solution of 44 ml of 1,1,1,3,3,3-hexamethyldisilazane dissolved in 58 ml of toluene was dropped thereinto over 30 minutes. The obtained mixture was stirred at 5° C. for one hour, and at 95° C. for three hours, respectively. The resultant reaction mixture was filtered, and the obtained solid was washed four times with each one liter of toluene at 95° C., and two times with each one liter of hexane at a room temperature, respectively. The washed solid was dried at 40° C. for two hours under a reduced pressure, thereby obtaining 120 g of a pretreated silica, which is hereinafter referred to as the "component (d1)".

(2) Production of Catalyst Component for Addition Polymerization

Air contained in a four-necked 100 ml flask was replaced with nitrogen, and then, 5.02 g of the above-mentioned component (d1) was put thereinto. Next, 54 ml of toluene was added thereto under washing down the component (d1) adhering to a wall of the flask. To the resultant mixture, 6.3 ml (12.5 mmol of triethylaluminum) of a toluene solution (concentration: 2.00 mol/liter) of triethylaluminum was added, and the obtained mixture was cooled to 5° C. Into the cooled mixture, 1.75 ml (16.6 mmol) of 1,1,1,3,3,3-hexafluoro-2-propanol was dropped over 0.25 hour, and then, the mixture was stirred for 1.5 hours at 5'. To the mixture, 0.74 g of a methylboronic acid powder was added. Next, 3.0 ml of toluene was added thereto under washing down the methylboronic acid powder adhering to a wall of the flask. The obtained mixture was stirred at 5° C. for one hour, and at 80° C. for two hours, respectively. The resultant reaction mixture was filtered, and the obtained solid was washed on a filter four times with each 50.0 ml of toluene at 80° C., and two times with each 50.0 ml of hexane at a room temperature, respectively. The washed solid was dried at 60° C. for one hour under a reduced pressure, thereby obtaining 7.05 g of a catalyst component for addition polymerization, which is hereinafter referred to as the "component (A1)".

(3) Polymerization

A 3 liter-volume autoclave equipped with a stirrer was dried under a reduced pressure, and then, air contained in the autoclave was replaces with argon. The autoclave was evacuated, and thereinto, hydrogen was put so as to obtain its partial pressure of 0.022 MPa, and then, 690 g of butane and 60 g of 1-butene were fed thereto. The resultant mixture was heated to 70° C., and then, ethylene was fed thereto so as to obtain its partial pressure of 1.6 Mpa, and the system was stabilized. A gas chromatography analysis showed a gas composition in the system of 1.02% by mol of hydrogen, and 3.40% by mol of 1-butene. To the mixture, 0.9 ml of a hexane solution (concentration: 1 mmol/ml) of triisobutylaluminum was added. Next, 0.50 ml of a toluene solution (concentration: 2 μmol/ml) of racemic ethylenebis(1-indenyl)zirconium dichloride, and 6.0 mg of the above-mentioned component (A1) (solid catalyst component) were added thereto in this order. Polymerization was carried out at 70° C. for 60 minutes, during which a mixed gas (hydrogen concentration: 0.37% by mol) of ethylene and hydrogen was continuously fed thereto so as to keep the total pressure constant.

As a result, 27 g of an olefin polymer having a good particle property was produced. A polymerization activity per mol of a zirconium atom was 2.7×10$^7$ g/mol-Zr/hour, and that per g of the solid catalyst component was 4,500 g/g-solid catalyst component/hour. The olefin polymer had a short chain branch number (SCB) of 14.3, a melt flow rate (MFR) of 0.25 g/10 minutes, a melt flow rate ratio (MFRR) of 169, and a swelling ratio (SR) of 1.17. Results are summarized in Table 1.

The above-mentioned and below-mentioned "SCB" was obtained according to a method comprising the steps of:

(1) measuring an infrared absorption spectrum of the obtained olefin polymer with an infrared spectrophotometer, FT-IR 7300, manufactured by Japan Spectroscopic Co., Ltd.;

(2) determining an amount of a 1-butene unit contained in the olefin polymer from characteristic absorptions of an ethylene unit and a 1-butene unit in the infrared absorption spectrum, using a calibration curve prepared in advance; and (3) determining a short chain branch number (SCB) per 1,000 carbon atoms in the olefin polymer, from the amount of a 1-butene unit determined above.

The above-mentioned and below-mentioned "MFR" was measured according to the method prescribed in Japanese Industrial Standards (JIS) K7210-1995 at 190° C. under a load of 21.18 N (2.16 kg), using a blend of the olefin polymer with 1,000 ppm of calcium stearate (antioxidant), and 1,000 ppm of IRGANOX 1076 (antioxidant). Generally, the smaller the MFR is, the higher a molecular weight of the olefin polymer is.

The above-mentioned and below-mentioned "MFRR" was measured, according to the method prescribed in JIS K7210-1995, by dividing a melt flow rate measured at 190° C. under a load of 211.82 N (21.60 kg) by a melt flow rate measured at 190° C. under a load of 21.18 N (2.16 kg).

The above-mentioned and below-mentioned "SR" was measured by dividing a diameter of a strand obtained in the above MFR measurement by an inner diameter of a die (2.095 mm).

Example 2

(1) Production of Catalyst Component for Addition Polymerization

Example 1 (2) was repeated except that (1) 5.02 g of the component (d1) was changed to 5.03 g thereof, and (2) 0.74 g of of a methylboronic acid powder was changed to 1.95 g of a zirconium hydroxide powder, thereby obtaining 8.69 g of a catalyst component for addition polymerization, which is hereinafter referred to as the "component (A2)".

(2) Polymerization

Example 1 (3) was repeated except that (1) 6.0 mg of the component (A1) was changed to 7.3 mg of the above-mentioned component (A2), (2) the gas chromatography analysis showed a gas composition in the system of 1.10% by mol of hydrogen, and 2.57% by mol of 1-butene, and (3) the mixed gas of ethylene and hydrogen continuously fed had a hydrogen concentration of 0.41% by mol.

As a result, 126 g of an olefin polymer having a good particle property was produced. A polymerization activity per mol of a zirconium atom was $1.3 \times 10^8$ g/mol-Zr/hour, and that per g of the solid catalyst component was 17,300 g/g-solid catalyst component/hour. The olefin polymer had SCB of 16.9, MFR of 1.9 g/10 minutes, MFRR of 48, and SR of 1.31. Results are summarized in Table 1.

Comparative Example 1

(1) Production of Catalyst Component for Addition Polymerization

Into a four-necked 200 ml flask, air contained in which had been replaced with nitrogen, 88.0 ml of toluene and 12.5 ml (25.0 mmol of trimethylaluminum) of a toluene solution (concentration: 2.00 mol/liter) of trimethylaluminum were put, and the resultant mixture was cooled to 5° C. Into the mixture, 0.44 ml (24.5 mmol) of water was dropped over one hour. Thereafter, the mixture was stirred at 5° C. for 1.5 hours, at 40° C. for two hours, and then, at 80° C. for two hours, in this order, and the mixture was let alone overnight. The mixture was cooled to 5° C., and then, 4.86 g of the same heat-treated silica as that used in Example 1 (1) was added thereto. Next, silica adhering to a wall of the flask was washed down with 5.0 ml of toluene. Thereafter, the mixture was stirred at 5° C. for one hour, at 40° C. for one hour, and then at 80° C. for two hours, in this order. The resultant mixture was filtered, and the obtained solid was washed four times with each 100.0 ml of toluene at 80° C., and two times with each 100.0 ml of hexane at a room temperature, respectively. The washed solid was dried at 60° C. for one hour under a reduced pressure, thereby obtaining 6.10 g of a solid product. An elemental analysis of the solid product showed a content of an aluminum atom of 3.0 mmol/g-solid product, and a content of a silicon atom of 13.2 mmol/g-solid product.

(2) Modification of Catalyst Component for Addition Polymerization

Into a four-necked 50 ml flask, air contained in which had been replaced with nitrogen, 17.0 ml of toluene and 2.05 g of the solid product obtained in the above Comparative Example 1 (1) were put, and the resultant mixture was cooled to 5° C. Into the mixture, 3.5 ml (7.0 mmol) of a toluene solution (concentration: 2.00 mol/liter) of pentafluorophenol was dropped over 0.5 hour. The mixture was stirred at 5° C. for one hour, and then at 80° C. for two hours, respectively. The resultant mixture was filtered, and the obtained solid was washed four times at 80° C. with each 20.0 ml of toluene, and then, two times at a room temperature with each 20.0 ml of hexane, respectively. The washed solid was dried at 40° C. for one hour under a reduced pressure, thereby obtaining 2.60 g of a solid product.

(3) Polymerization

Example 1 (3) was repeated except that (1) 6.0 mg of the component (A1) was changed to 6.8 mg of the solid product obtained in Comparative Example 1 (2), (2) the gas chromatography analysis showed a gas composition in the system of 1.06% by mol of hydrogen, and 3.52% by mol of 1-butene, (3) the mixed gas of ethylene and hydrogen continuously fed had a hydrogen concentration of 0.46% by mol, and (4) the polymerization time was changed to 30 minutes.

As a result, 140 g of an olefin polymer was obtained. A polymerization activity per mol of a zirconium atom was $2.8 \times 10^8$ g/mol-Zr/hour, and that per g of the solid catalyst component was 41,000 g/g-solid catalyst component/hour. The olefin polymer had SCB of 20.4, MFR of 7.5 g/10 minutes, MFRR of 34, and SR of 1.38. Results are summarized in Table 1.

Comparative Example 2

(1) Production of Catalyst Component for Addition Polymerization

Comparative Example 1 (1) was repeated except that (1) 88.0 ml of toluene put into the flask was changed to 97.0 ml thereof, (2) 12.5 ml (25.0 mmol of trimethylaluminum) of a toluene solution (concentration: 2.00 mol/liter) of trimethylaluminum was changed to 3.4 ml (25 mmol) of triethylaluminum, and (3) 4.86 g of the heat-treated silica added was changed to 4.89 g thereof, thereby obtaining 6.45 g of a solid product. An elemental analysis of the solid product showed a content of an aluminum atom of 3.5 mmol/g-solid product, and a content of a silicon atom of 12.1 mmol/g-solid product.

(2) Modification of Catalyst Component for Addition Polymerization

Comparative Example 1 (2) was repeated except that (1) 2.05 g of the solid product was changed to 2.02 g of the solid product obtained in the above Comparative Example 2 (1), and (2) 3.5 ml (7.0 mmol) of a toluene solution (concentration: 2.00 mol/liter) of pentafluorophenol was changed to 3.4 ml (7.0 mmol) thereof, thereby obtaining 2.50 g of a solid product.

(3) Polymerization

Example 1 (3) was repeated except that (1) 6.0 mg of the component (A1) was changed to 6.7 mg of the solid product obtained in Comparative Example 2 (2), (2) the gas chromatography analysis showed a gas composition in the system of 1.05% by mol of hydrogen, and 3.60% by mol of 1-butene, (3) the mixed gas of ethylene and hydrogen continuously fed had a hydrogen concentration of 0.46% by mol, and (4) the polymerization time was changed to 30 minutes.

As a result, 160 g of an olefin polymer was obtained. A polymerization activity per mol of a zirconium atom was $3.2 \times 10^8$ g/mol-Zr/hour, and that per g of the solid catalyst component was 47,800 g/g-solid catalyst component/hour. The olefin polymer had SCB of 20.7, MFR of 12.7 g/10 minutes, and SR of 1.33. Results are summarized in Table 1.

Example 3

(1) Production of Catalyst Component for Addition Polymerization

Example 1 (2) was repeated except that (1) 5.02 g of the component (d1) was changed to 5.03 g thereof, and (2) 0.74 g of of a methylboronic acid powder was changed to 2.65 g of diphenylsilanediol powder, thereby obtaining 5.35 g of a catalyst component for addition polymerization, which is hereinafter referred to as the "component (A3)".

(2) Polymerization

Example 1 (3) was repeated except that (1) 6.0 mg of the component (A1) was changed to 6.0 mg of the above-mentioned component (A3), and (2) the gas chromatography analysis showed a gas composition in the system of 1.11% by mol of hydrogen, and 3.29% by mol of 1-butene.

As a result, 9 g of an olefin polymer was produced. A polymerization activity per mol of a zirconium atom was $9.0 \times 10^6$ g/mol-Zr/hour, and that per g of the solid catalyst component was 1,500 g/g-solid catalyst component/hour. The olefin polymer had SCB of 10.0, MFR of 2.4 g/10 minutes, MFRR of 32, and SR of 1.49. Results are summarized in Table 1.

TABLE 1

|  | Example | | | Comparative Example | |
| --- | --- | --- | --- | --- | --- |
|  | 1 | 2 | 3 | 1 | 2 |
| Compound (a) | Al(C$_2$H$_5$)$_3$ | Al(C$_2$H$_5$)$_3$ | Al(C$_2$H$_5$)$_3$ | Al(CH$_3$)$_3$ | Al(C$_2$H$_5$)$_3$ |
| Compound (b) (Note 1) | HFP | HFP | HFP | PFP | PFP |
| Compound (c) (Note 2) | MBA | Zr(OH)$_4$ |  | H$_2$O | H$_2$O |
| Particle (d) | SiO$_2$ | SiO$_2$ | SiO$_2$ | SiO$_2$ | SiO$_2$ |
| Compound (e) (Note 3) |  |  | DPSD |  |  |
| Gas composition in the system |  |  |  |  |  |
| Hydrogen (% by mol) | 1.02 | 1.10 | 1.11 | 1.06 | 1.05 |
| 1-butene (% by mol) | 3.40 | 2.57 | 3.29 | 3.52 | 3.60 |
| Polymerization time (min) | 60 | 60 | 60 | 30 | 30 |
| Polymerization activity |  |  |  |  |  |
| g/mol-Zr/hour | 2.7 × 10$^7$ | 1.3 × 10$^8$ | 9.0 × 10$^6$ | 2.8 × 10$^8$ | 3.2 × 10$^8$ |
| g/g-solid catalyst component/hr | 4,500 | 17,300 | 1,500 | 41,000 | 47,800 |
| Olefin polymer |  |  |  |  |  |
| SCB | 14.3 | 16.9 | 10.0 | 20.4 | 20.7 |
| MFR (g/10 min) | 0.25 | 1.9 | 2.4 | 7.5 | 12.7 |
| MFRR | 169 | 48 | 32 | 34 |  |
| SR | 1.17 | 1.31 | 1.49 | 1.38 | 1.33 |

(Note 1) HFP is 1,1,1,3,3,3-hexafluoro-2-propanol; and PFP is pentafluorophenol.
(Note 2) MBA is methylboronic acid.
(Note 3) DPSD is diphenylsilanediol.

The invention claimed is:

1. A process for producing a modified particle, which comprises the step of contacting a compound (a) represented by the following formula [1], a compound (b) represented by the following formula [2], a compound (e) represented by the following formula [4], and a particle (d) with one another:

$$M^1L^1{}_3 \qquad [1]$$

$$R^1{}_{t-1}TH \qquad [2]$$

$$R^2{}_{4-n}J(OH)_n \qquad [4]$$

wherein $M^1$ is an atom of Group 13 in the periodic table; $L^1$ is a hydrogen atom, a hydrocarbon group or a halogen atom, and three $L^1$s are the same as, or different from one another; T is a non-metal atom of Group 15 or 16 in the periodic table; t is the valence of T; $R^1$ is an electron-withdrawing group or a group containing an electron-withdrawing group, and when plural $R^1$s exist, they are the same as, or different from one another; J is a non-metal atom of Group 14 in the periodic table; n is a number satisfying $2 \leq n \leq 4$; and $R^2$ is a hydrocarbon group or a halogenated hydrocarbon group, and when plural $R^2$s exist, they are the same as, or different from one another.

2. The process for producing a modified particle according to claim 1, wherein J is a silicon atom.

3. A carrier, which comprises a modified particle produced by the process according to claim 1.

4. A catalyst component (A) for addition polymerization, which comprises a modified particle produced by the process according to claim 1.

5. A process for producing a catalyst for addition polymerization, which comprises the step of contacting the catalyst component (A) for addition polymerization according to claim 4, a transition metal compound (B), and an optional organoaluminum compound (C) with one another.

6. The process for producing a catalyst for addition polymerization according to claim 5, wherein the transition metal compound (B) has at least one cyclopentadiene-containing anionic group.

7. A process for producing an addition polymer, which comprises the step of addition polymerizing an addition-polymerizable monomer in the presence of a catalyst for addition polymerization produced by the process according to claim 6.

8. The process for producing an addition polymer according to claim 7, wherein the addition polymerizable monomer is an olefin.

9. The process for producing an addition polymer according to claim 7, wherein the addition polymerizable monomer is a combination of ethylene with an α-olefin.

* * * * *